(12) United States Patent
Bode et al.

(10) Patent No.: US 12,466,363 B2
(45) Date of Patent: Nov. 11, 2025

(54) TELESCOPIC NOZZLE DEVICE FOR CLEANING A VEHICLE SURFACE, VEHICLE AND SYSTEM FOR CLEANING A VEHICLE SURFACE

(71) Applicant: A. RAYMOND ET CIE, Grenoble (FR)

(72) Inventors: Karl Bode, Lörrach (DE); Michael Thomas Brenneisen, Efringen-Kirchen (DE); Armin Reinacher, Weil am Rhein (DE)

(73) Assignee: A. RAYMOND ET CIE, Grenoble (FR)

(*) Notice: Subject to any disclaimer, the term of this patent is extended or adjusted under 35 U.S.C. 154(b) by 512 days.

(21) Appl. No.: 17/944,520

(22) Filed: Sep. 14, 2022

(65) Prior Publication Data
US 2023/0219531 A1    Jul. 13, 2023

(30) Foreign Application Priority Data
Sep. 15, 2021 (EP) ..................... 21196883

(51) Int. Cl.
*B60S 1/52*   (2006.01)
*B05B 1/20*   (2006.01)
*B05B 1/30*   (2006.01)

(52) U.S. Cl.
CPC ............. *B60S 1/528* (2013.01); *B05B 1/205* (2013.01); *B05B 1/3026* (2013.01)

(58) Field of Classification Search
CPC .... B60S 1/46; B60S 1/52; B60S 1/528; B05B 1/205; B05B 1/3026; B05B 1/10
USPC .......................... 239/284.1, 284.2, 203–205
See application file for complete search history.

(56) References Cited

U.S. PATENT DOCUMENTS

| | | | | | |
|---|---|---|---|---|---|
| 3,230,564 | A | * | 1/1966 | McDevitt ................ | B60S 1/528 239/284.1 |
| 3,237,866 | A | * | 3/1966 | Lovell ..................... | B60S 1/528 239/284.1 |
| 8,876,019 | B2 | * | 11/2014 | Discher ................... | B60S 1/528 239/284.1 |

FOREIGN PATENT DOCUMENTS

| | | |
|---|---|---|
| DE | 4121316 A1 | 1/1992 |
| DE | 102008020879 A1 | 10/2009 |
| EP | 0262402 A2 | 4/1988 |
| EP | 3708443 A1 | 9/2020 |

(Continued)

OTHER PUBLICATIONS

Machine assisted English translation of EP0262402A2 obtained from https://patents.google.com/patent on Sep. 13, 2022, 7 pages.

(Continued)

*Primary Examiner* — Steven J Ganey
(74) *Attorney, Agent, or Firm* — WARNER NORCROSS + JUDD LLP

(57) ABSTRACT

A telescopic nozzle device for cleaning a vehicle surface comprises a housing having a fluid inlet channel and a rod opening that opens towards the inside of the housing at one end of the rod opening and opens towards the outside of the housing at a second end of the rod opening. The device further comprises a hollow nozzle rod having a rod channel, an inlet opening, and a nozzle for ejecting washing fluid from inside the rod channel to the outside of the nozzle rod. The nozzle rod is moveable between a retracted position and an extended position. The device also includes a guiding system that guides the nozzle rod between the retracted and extended positions.

11 Claims, 22 Drawing Sheets

(56) References Cited

FOREIGN PATENT DOCUMENTS

FR    3005623 A1    11/2014
GB    2026851 A     2/1980

OTHER PUBLICATIONS

Machine assisted English translation of DE4121316A1 obtained from https://patents.google.com/patent on Sep. 13, 2022, 7 pages.
Machine assisted English translation of DE102008020879A1 obtained from https://patents.google.com/patent on Sep. 13, 2022, 7 pages.
Machine assisted English translation of FR3005623A1 obtained from https://patents.google.com/patent on Sep. 13, 2022, 6 pages.

* cited by examiner

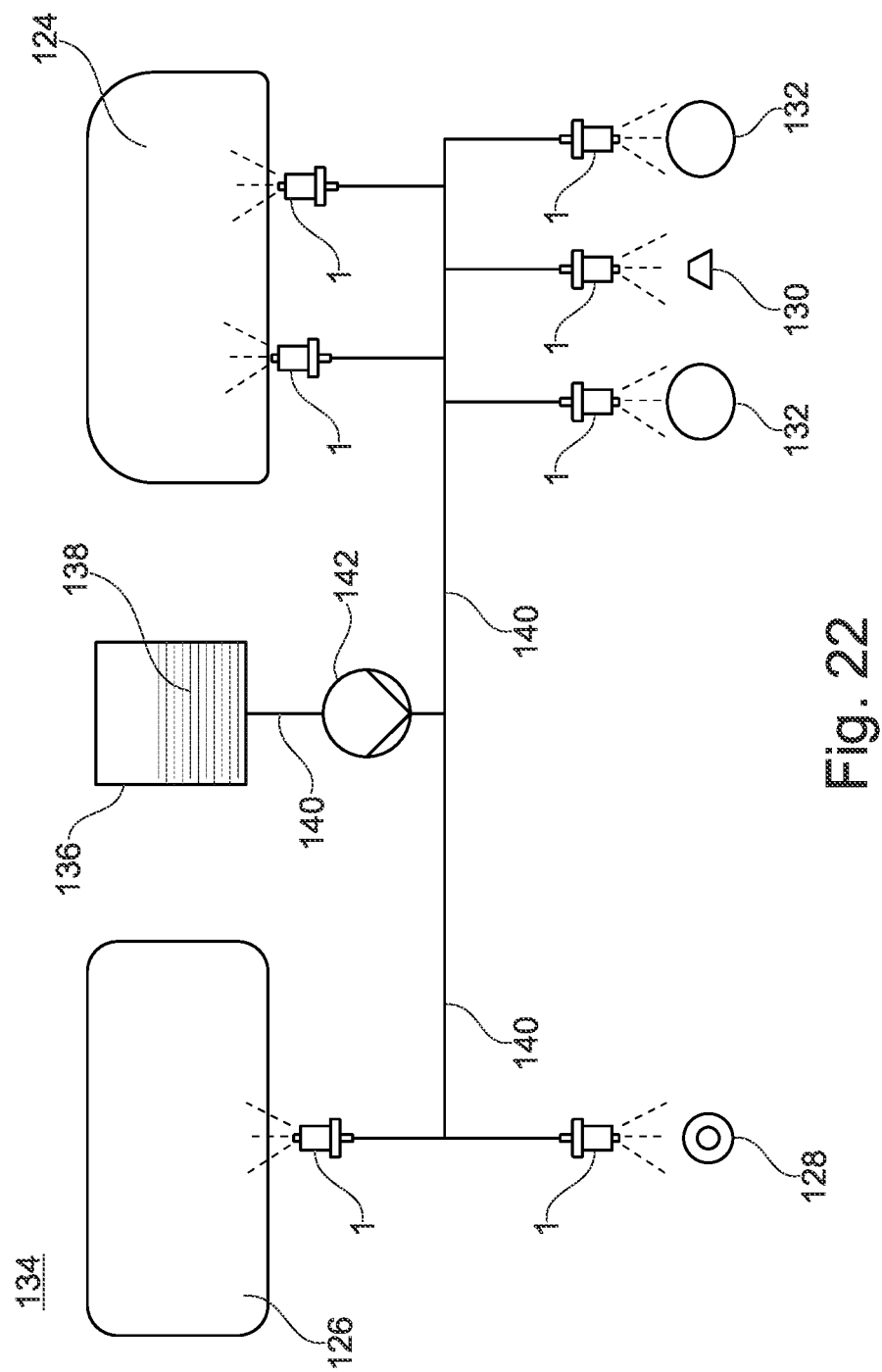

TELESCOPIC NOZZLE DEVICE FOR CLEANING A VEHICLE SURFACE, VEHICLE AND SYSTEM FOR CLEANING A VEHICLE SURFACE

CROSS-REFERENCE TO RELATED APPLICATIONS

This application claims priority to and all advantages of European Patent Application No. 21196883.9, filed on 15 Sep. 2021, the contents of which are hereby incorporated by reference.

FIELD OF THE INVENTION

The invention pertains to a telescopic nozzle device for cleaning a vehicle surface. The invention also pertains to a vehicle. The invention also pertains to a system for cleaning a vehicle surface.

BACKGROUND OF THE INVENTION

A telescopic nozzle device for cleaning a vehicle surface is known from EP 3 708 443 A1. The nozzle device disclosed therein has a housing, the housing having a fluid inlet channel suitable for introducing a washing fluid into the housing and a rod opening that opens towards the inside of the housing at one end of the rod opening and opens towards the outside of the housing at a second end of the rod opening. The telescopic nozzle device known from EP 3 708 443 A1 also has a hollow nozzle rod having a rod channel, an inlet opening for introducing washing fluid from outside the nozzle rod into the rod channel and a nozzle for ejecting washing fluid from inside the rod channel to the outside of the nozzle rod. The nozzle rod has a retracted position shown in FIG. 1 of EP 3 708 443 A1 and an extended position shown in FIG. 2 of EP 3 708 443 A1. The nozzle rod is moveable between the retracted position and the extended position. As can be seen from FIG. 1 and FIG. 2 of EP 3 708 443 A1, the nozzle rod extends into the rod opening both in the retracted position and in the extended position. The nozzle rod extends through the rod opening in the extended position in the device known from EP 3 708 443 A1. The design known from EP 3 708 443 A1 provides a guiding system that guides the nozzle rod as it moves from the retracted position to the extended position by way of ribs provided on the nozzle rod and slots provided as part of the rod opening that receive the ribs. The ribs can be elongated to maintain engagement between the ribs and the slots in both the retracted and the extended position. In the design known from EP 3 708 443 A1, the ribs extend through the rod opening in the extended position of the nozzle rod.

Because in the design known from EP 3 708 443 A1 it is necessary that the ribs extend through the rod opening in the extended position, the part of the nozzle rod that extends through the rod opening and beyond the rod opening in the extended position has a massive appearance.

Given this background, the problem to be solved by the invention is to provide a telescopic nozzle device that has a lighter appearance in the extended position of the nozzle rod.

BRIEF SUMMARY OF THE INVENTION

A telescopic nozzle device for cleaning a surface of a vehicle is disclosed. The nozzle device has a housing, the housing having a fluid inlet channel suitable for introducing a washing fluid into the housing; and a rod opening that opens towards the inside of the housing at one end of the rod opening and opens towards the outside of the housing at a second end of the rod opening. The nozzle device also includes a hollow nozzle rod having a rod channel, an inlet opening for introducing washing fluid from outside the nozzle rod into the rod channel, and a nozzle for ejecting washing fluid from inside the rod channel to the outside of the nozzle rod. The nozzle rod has a retracted position and an extended position and is moveable between the retracted position and the extended position, the nozzle rod extending through the rod opening in the extended position. The nozzle device further includes a guiding system that guides the nozzle rod as it moves from the retracted position to the extended position. The guiding systems comprises a housing guide that is arranged inside the housing, the housing guide having a housing guide surface; and a rod guide that forms part of the nozzle rod and has a rod guide surface that is in contact or can come into contact with the housing guide surface to guide the nozzle rod as it moves from the retracted position to the extended position.

The invention is based on the basic concept to provide the guiding system with a housing guide that is arranged inside the housing whereby the housing guide has a housing guide surface and to provide the guiding system with a rod guide that forms part of the nozzle rod and has a rod guide surface that is in contact with or can come into contact with the housing guide surface to guide the nozzle rod as it moves from the retracted position to the extended position. The invention hence deviates from the concept known from EP 3 708 443 A1 that uses the slots in the rod opening as guides for the ribs throughout the entire movement of the nozzle rod from the retracted position to the extended position. By use of the housing guide that is arranged inside the housing, the invention introduces new guiding means that can be used to interact with the rod guide for at least parts of the movement of the nozzle rod from the retracted position to the extended position without the need of the rod guide being in engagement with the rod opening.

The housing guide and the rod guide can in a preferred embodiment be used for the initial guiding of the nozzle rod as it leaves the retracted position. This allows the rod guide in a preferred embodiment to be arranged distanced from the rod opening when the nozzle rod is in the retracted position.

In a preferred embodiment, a part of the rod guide can be arranged inside the rod opening when the nozzle rod is in the extended position. But in this design, the rod guide can be designed such that it terminates in the rod opening when the nozzle rod is in the extended position and hence does not protrude out of the rod opening like the ribs in the design of EP 3 708 443 A1 protrude out of the rod opening when the nozzle rod is in the extended position. This allows the part of the nozzle rod that extends beyond the rod opening when the nozzle rod is in the extended position to be designed smaller. Typically, the user of such a telescopic nozzle device will only see that part of the nozzle rod that extends beyond the rod opening in the extended position. Hence, if this part can be made smaller and lighter, the general appearance to the user will be more lighter.

The telescopic nozzle device according to the invention is suitable for cleaning a vehicle surface. Typically, such nozzle devices are used for cleaning a front or rear windscreen of a vehicle or for cleaning glasses of headlights of vehicles or for cleaning surfaces of cameras or sensors.

The nozzle device has a housing. The inside of the housing is the space arranged inside the housing. In a preferred embodiment, the housing is made up of several individual parts, preferably of two parts, preferably of an upper part and a lower part. In a preferred embodiment, the parts that make up the housing can be connected to each other. The individual parts can be connected to each other permanently, for example by way of gluing or welding. In a preferred embodiment, the parts that make up the housing are connected to each other in a releasable manner. This can be provided for by way of threads, for example one part having an external thread and the other part having an internal thread that allow these two parts to be threaded together. In a preferred embodiment, the connection between the parts that make up the housing is a snap-fit connection. In a preferred embodiment, the housing has an upper part and a lower part, whereby the upper part can be snap-fit to the lower part.

In a preferred embodiment, the upper part of the housing is made up of sections that are arranged in sequence along a longitudinal axis along which the upper part extends. In a preferred embodiment, the geometric shape of a first section of the upper part is different to the geometric shape of a second section of the upper part. In a preferred embodiment, a section of the upper part has the shape of a hollow cylinder. In a preferred embodiment, a section of the upper part of the housing has the shape of a hollow truncated cone.

In a preferred embodiment, the lower part of the housing is made up of sections that are arranged in sequence along a longitudinal axis along which the lower part extends. In a preferred embodiment, the geometric shape of a first section of the upper part is different to the geometric shape of a second section of the upper part. In a preferred embodiment, a section of the lower part has the shape of a hollow cylinder. In a preferred embodiment, a section of the lower part of the housing has the shape of a hollow truncated cone. In a preferred embodiment, a section of the lower part of the housing has the shape of a square or a dice. In a preferred embodiment, the nozzle rod has a lower part that has a section that is formed like a square or a dice that is arranged inside a section of the lower part of the housing has the shape of a square or a dice.

In a preferred embodiment, the upper part of the housing terminates in an upper end wall. In a preferred embodiment, the rod opening is arranged in the upper end wall. In a preferred embodiment, the lower part of the housing terminates in a bottom wall.

The housing has a fluid inlet channel suitable for introducing a washing fluid into the housing. The fluid inlet channel can be provided by a fluid inlet opening arranged in a part of the housing, preferably arranged in the lower part of the housing. In a preferred embodiment, the fluid inlet channel is provided by a pipe that protrudes from a part of the housing, preferably protrudes from the lower part of the housing. The pipe can be adapted for attaching a hose to it, for example can have an end shape that has the shape of a truncated cone that facilitates feeds the end of a hose onto the pipe. The truncated cone can end in a recess or can be seen to extend over further parts of the pipe in a wedge-shaped manner. Such a design can be used to hold back a flexible hose from slipping off the pipe.

The housing has a rod opening that opens towards the inside of the housing at one end of the rod opening and opens towards the outside of the housing at a second end of the rod opening. The rod opening preferably is delimited by a rod opening wall. In a preferred embodiment, the rod opening has a circular shape. In a preferred embodiment, the rod opening has a circular shape that is interrupted by a slot, the slot extending further outward and enlarging the otherwise circular opening by the area of the slot. In a preferred embodiment, the rod opening only has a single slot.

The telescopic nozzle device has a hollow nozzle rod. The hollow nozzle rod has a rod channel and an inlet opening for introducing washing fluid from outside the rod into the rod channel and a nozzle for ejecting washing fluid from inside the rod channel to the outside of the nozzle rod.

In a preferred embodiment, the inlet opening is arranged at one end of the nozzle rod. In a preferred embodiment, the nozzle is arranged at one end of the nozzle rod. In a preferred embodiment, the inlet opening is arranged at a first end of the nozzle rod and the nozzle is arranged at a second end of the nozzle rod. In a preferred embodiment, the inlet opening provides a fluid communication between the rod channel and the inside of the housing at least in the extended position of the nozzle rod.

In a preferred embodiment the nozzle has the form of a slit. In an alternative embodiment, the nozzle can be provided by an insert that is inserted into a hole in the nozzle rod wall. Such insert can provide specific nozzle shapes that can better influence the shape of the fluid spray that is expelled by the nozzle. The insert can be fixedly arranged in the hole, for example by way of press fit or by way of glueing or by way of welding.

In a preferred embodiment, the nozzle rod is a longitudinal body that extends along a longitudinal axis. In a preferred embodiment, the nozzle rod has a section that has the shape of a hollow cylinder. In a preferred embodiment, that part of the nozzle rod that extends beyond the rod opening in the extended position has the shape of a hollow cylinder. In a preferred embodiment, the nozzle is arranged in that part of the nozzle rod that extends beyond the rod opening in the extended position.

In a preferred embodiment, the nozzle rod is a two-piece element. In a preferred embodiment, the nozzle is arranged in a first part, preferably in an upper part of the nozzle rod. In a preferred embodiment, the inlet opening is arranged in a second part, preferably in a lower part of the nozzle rod. In a preferred embodiment, the parts that make up the nozzle rod are connected to each other. In a preferred embodiment, the parts that make up the nozzle rod are connected to each other in a permanent manner, for example by way of gluing or by way of welding. In a preferred embodiment, the parts that make up the nozzle rod are engaged to each other by way of a releasable connection, for example by way of screwing or preferably by way of snap-fit.

In a preferred embodiment, the nozzle rod is made up of at least two parts and the rod channel is made up of a first rod channel part arranged inside a first piece of the nozzle rod and a second rod channel part arranged inside a second part of the nozzle rod. In a preferred embodiment, a sealing, preferably an O-ring, is arranged in the area where the first rod channel part ends and the second rod channel part begins.

In a preferred embodiment, a membrane is arranged between the nozzle rod and the housing. In a preferred embodiment, the membrane terminates in an inner rim that is connected to an outside surface of the nozzle rod. In a preferred embodiment, the membrane terminates in an outer rim that is attached to the housing.

In a preferred embodiment, the inner rim of the membrane is provided by a hollow cylinder. In a preferred embodiment, the hollow cylinder that provides the inner rim of the membrane is held between a blocking surface of a first part of the nozzle rod and a blocking surface of a second part of the nozzle rod. In a preferred embodiment, the nozzle rod has a first part that has a rim-shaped, radially extending blocking surface and the nozzle rod has a second part that has a rim-shaped, radially extending blocking surface, whereby the blocking surface of the first part of the nozzle rod is facing the blocking surface of the second part of the nozzle rod. The blocking surface of the first part of the nozzle rod can be provided by a rim-shaped, radially extending end surface of the first part of the nozzle rod. In a preferred embodiment, the second part of the nozzle rod has a tube-shaped section, whereby the blocking surface radially extends in a rim-shaped manner from the outer circumference of the tube-shaped section. In a preferred embodiment, the tube-shaped section of the second part of the nozzle rod extends into the hollow cylinder that makes up the inner rim of the membrane. In a preferred embodiment fingers extend from the tube-shaped section of the second part of the nozzle rod. In a preferred embodiment the fingers have wedge-shaped ends that can be used to snap-fit the fingers into openings provided in that part of the first part of the nozzle rod that provides the rim-shaped, radially extending end surface of the first part of the nozzle rod.

In a preferred embodiment, the outer rim of the membrane is provided by a hollow cylinder or by a ring. In a preferred embodiment, the hollow cylinder that provides the outer rim of the membrane is held between a blocking surface of a first part of the housing and a blocking surface of a second part of the housing. In a preferred embodiment, the housing has a first part that has a rim-shaped, radially extending blocking surface and the housing has a second part that has a rim-shaped, radially extending blocking surface, whereby the blocking surface of the first part of housing is facing the blocking surface of the second part of the housing. The blocking surface of the second part of the housing can be provided by a rim-shaped, radially extending end surface of the second part of housing. In a preferred embodiment, the first part of the housing has a tube-shaped section, whereby the blocking surface radially extends in a rim-shaped manner from the inner circumference of the tube-shaped section, for example like a step in the tube-shaped section. In a preferred embodiment, the tube-shaped section of the first part of the housing extends along the outside of the hollow cylinder that makes up the outer rim of the membrane.

In a preferred embodiment, the inner rim of the membrane is arranged on one side of the outer rim of the membrane when the nozzle rod is in the retracted position and the inner rim of the membrane is arranged on the opposite side of the outer rim of the membrane when the nozzle rod is in the extended position.

In a preferred embodiment, the membrane is generally ring-shaped.

The nozzle rod of the telescopic nozzle device according to the invention has a retracted position. In a preferred embodiment, the retracted position is the terminal position of the nozzle rod in one direction. In a preferred embodiment, the nozzle rod cannot be moved beyond the retracted position in this direction. In a preferred embodiment, the nozzle rod has an end surface that abuts against a surface of the housing when the nozzle rod is in the retracted position. In a preferred embodiment, the end surface of the nozzle rod is arranged in a second part of the housing, when the nozzle rod is in the retracted position. In a preferred embodiment, the end surface of the nozzle rod abuts against the bottom surface arranged in the second part of the housing, when the nozzle rod is in the retracted position.

According to the invention, the nozzle rod has an extended position. The nozzle rod is moveable between the retracted position and the extended position, whereby the nozzle rod extends through the rod opening in the extended position. In a preferred embodiment, the nozzle rod is linearly moveable between the retracted position and the extended position. In a preferred embodiment, a top end surface of the nozzle rod is flush with a top end surface of the housing when the nozzle rod is in the retracted position. Alternatively, the nozzle rod extends through the rod opening by a first amount when the nozzle rod is in the retracted position and extends through the rod opening by a second amount when the nozzle rod is in the extended position, whereby the second amount is larger than the first amount.

According to the invention, the telescopic nozzle device has a guiding system that guides the nozzle rod as it moves from the retracted position to the extended position. According the invention, the guiding systems comprises a housing guide that is arranged inside the housing, the housing guide having a housing guide surface. According to the invention, the guiding system comprises a rod guide that forms part of the nozzle rod and has a rod guide surface that can come into contact with the housing guide surface to guide the nozzle rod as it moves from the retracted position to the extended position.

In a preferred embodiment, the nozzle rod moves along a linear axis from the retracted position to the extended position. In a preferred embodiment, the housing guide surface extends along an axis that is parallel to the linear axis. In a preferred embodiment, the rod guide surface extends along an axis that is parallel to the linear axis.

In a preferred embodiment, the housing guide surface is in contact with the rod guide surface as the nozzle rod moves from the retracted position to the extended position. In such an embodiment, the rod guide surface and the housing guide surface slide along each other as the nozzle rod moves from the retracted position to the extended position. It might be considered that such a sliding movement for the complete movement of the nozzle rod from the retracted position to the extended position causes too much friction. Hence, designs are feasible, where the housing guide surface and the rod guide surface are arranged distanced from each other. Should the nozzle rod twist or rotate about a linear axis as it moves from the retracted position to the extended position, this twisting or rotating movement would bring the rod guide surface into contact with the housing guide surface and would stop the twisting or rotating movement and would ensure that the nozzle rod predominantly travels along the linear axis from the retracted position to the extended position.

In a preferred embodiment, the housing guide surface is arranged in parallel to the rod guide surface. In a preferred embodiment, the housing guide surface is a flat surface and the rod guide surface is a flat surface.

In a preferred embodiment, a rib is arranged inside the housing, whereby the rib extends along a longitudinal axis and whereby the rib is arranged on an inward surface of the housing and extends along its longitudinal axis along the inward facing surface of the housing, whereby the housing guide surface is a longitudinal surface of the rib and extends along the longitudinal axis of the rib.

In an alternative, likewise preferred, embodiment, the housing guide has a lug that protrudes from an inward surface of a housing wall into the inside of the housing, whereby the housing guide surface is provided by a surface of the lug. Compared to the rib described in the previous preferred embodiment, the lug extends away from the inward surface of the housing wall into the inside of the housing. In a preferred embodiment, the lug extends along a longitudinal axis and the longitudinal axis is arranged at an angle to the inward surface of the housing wall, preferably at an angle between 45° and 135°, preferably at an angle of 90° to the inward surface of the housing wall from which the lug protrudes. The rib in the previously described preferred embodiment extends along a longitudinal axis along the inward surface of the housing wall and hence only extends from the inward surface of the housing wall by a small extent, namely the height of the rib. Contrary to this arrangement, the lug joins the inward surface of the housing wall only in a small cross-sectional area and is designed to protrude away from the inward surface of the housing wall.

In the embodiment where the housing guide surface is provided by a surface of the lug, the inward surface of the housing from which the lug protrudes preferably is the inward surface of the to end wall of the housing.

In the embodiment where the housing guide surface is provided by a surface of a rim, the rim preferably extends along an inward surface of a sidewall of the housing, preferably a sidewall of the first part, preferably of the upper part of a two part housing.

In a preferred embodiment, the rod opening is arranged in the housing wall from which housing wall the lug protrudes. In a preferred embodiment, the lug is arranged next to the rod opening. In a preferred embodiment, the rod opening is delimited by a rod opening wall, whereby the lug has a surface that is flush with a part of the rod opening wall.

In a preferred embodiment, the housing guide has several lugs that protrude from the inward surface of the housing wall into the inside of the housing. In a preferred embodiment, each lug provides a housing guide surface. In a preferred embodiment, all lugs protrude from the housing wall by the same amount. In an alternative, likewise preferred, embodiment, at least one of the several lugs protrudes further into the inside of the housing than at least one other of the several lugs. In a preferred embodiment, the housing guide has several lugs and of those several lugs one lug that protrudes furthest into the inside of the housing, while the remaining lugs do not protrude as far into the housing as the one lug. In a preferred embodiment, the further lugs protrude into the inside of the housing by the same amount. In an alternative, the further lugs protrude into the inside of the housing in a staggered fashion. In a preferred embodiment, the number of lugs present is more than two, preferably more than three. In a preferred embodiment, the number of lugs present is less than ten, preferably less than seven, preferably less than six.

In a preferred embodiment, the rod guide has a block that is arranged at an outer circumferential surface of the rod. In a preferred embodiment, the rod guide surface is provided by a surface of the block. In a preferred embodiment, the block is a rib that is arranged at an outer circumferential surface of the nozzle rod and extends along a longitudinal axis.

In a preferred embodiment, the housing guide has several blocks that are arranged at an outer circumferential surface of the nozzle rod. In a preferred embodiment, each block provides a rod guide surface. In a preferred embodiment, all blocks extend along the outer circumferential surface of the nozzle rod by the same amount. In an alternative, likewise preferred, embodiment, at least one of the several blocks extend along the outer circumferential surface of the nozzle rod further than at least one other of the several blocks. In a preferred embodiment, the rod guide has several blocks and of those several blocks one block that extend along the outer circumferential surface of the nozzle rod furthest, while the remaining blocks do not extend as far along the outer circumferential surface of the nozzle rod as the one block. In a preferred embodiment, the further blocks extend along the outer circumferential surface of the nozzle rod by the same amount. In an alternative, the further blocks extend along the outer circumferential surface of the nozzle rod in a staggered fashion. In a preferred embodiment, the number of blocks present is more than two, preferably more than three. In a preferred embodiment, the number of blocks present is less than ten, preferably less than seven, preferably less than six.

In a preferred embodiment the number of lugs provided is the same number of blocks provided.

In a preferred embodiment, each block is provided between two lugs when the nozzle rod is in the extended position.

In a preferred embodiment, the lugs provided extend in parallel to each other. In a preferred embodiment, the blocks provided extend in parallel to each other. In a preferred embodiment all lugs provided extend in parallel to all blocks provided. In a preferred embodiment the lugs provided extend in parallel to each other and in parallel to the linear direction along which the nozzle rod is moved from the retracted position to the extended position. In a preferred embodiment the blocks provided extend in parallel to each other and in parallel to the linear direction along which the nozzle rod is moved from the retracted position to the extended position.

In a preferred embodiment, the lugs are equally spaced along a circle around the linear direction along which the nozzle rod is moved from the retracted position to the extended position.

In a preferred embodiment, the blocks are equally spaced around the outer circumferential surface of the rod.

In a preferred embodiment, the lugs have a constant cross section along their linear extend. In a preferred embodiment, the blocks have a constant cross section along their linear extend.

In a preferred embodiment, a part of the rod guide is arranged inside the rod opening when the nozzle rod is in the extended position. In a preferred embodiment, the rod opening is a circular opening that is expanded by a slot that extends radially away from the remaining part of the rod opening. In a preferred embodiment, the part of the rod guide that is arranged inside the rod opening is arranged in this slot.

In a preferred embodiment, the block is arranged at the outer circumferential surface of the nozzle rod and has a top end surface. In a preferred embodiment, the housing wall, in which the rod opening is arranged, has a top, outward surface. In a preferred embodiment, the top surface of the block according to the preferred embodiment is arranged inside the rod opening, when the nozzle rod is in the extended position and does not protrude above the top surface of the housing wall. In a preferred embodiment, the top surface of the block is flush with the top surface of the housing wall.

In a preferred embodiment, the rod guide rests against an inward surface of a housing wall, when the nozzle rod is in the extended position, thereby blocking further movement of the nozzle rod out of the housing. In a preferred embodiment, the rod guide has at least two blocks, whereby the top surface of one block of the rod guide rests against an inward surface of the housing wall, blocking further movement of the nozzle rod out of the housing, whereby the top surface of the further block of the rod guide is arranged inside the rod opening, preferably flush with a top surface of the housing wall that contains the rod opening.

In a preferred embodiment, the housing guide has several lugs that protrude from the inward surface of the housing wall into the inside of the housing, whereby two of the several lugs protrude further into the inside of the housing than the remaining lugs, whereby these two lugs that protrude further into the housing are arranged next to each other. In a preferred embodiment, the above-described embodiment is supplemented by a rod guide that has several blocks, preferably several ribs, arranged at an outer circumferential surface of the nozzle rod, whereby one of the several blocks is longer than the other of the several blocks. In a preferred embodiment, the above-described embodiment is designed in such a way that when the nozzle rod is in the retracted position, a tip of the block that is longer than the other blocks is arranged inbetween the two lugs that are longer than the other lugs. In a preferred embodiment, the other blocks of the housing guide are arranged to not engage with spaces between the further lugs of the housing guide, when the nozzle rod is in the retracted position. Hence, in a preferred embodiment, when the nozzle rod is in the retracted position, it is only the one, longer block that is in engagement with the two longer lugs of the housing guide, namely arranged to protrude into a space between the two longer lugs. In a preferred embodiment, it is this longer block that, when the nozzle rod is in the extended position, is arranged inside in the rod opening.

In a preferred embodiment, the blocks are designed to have a rectangular cross-section perpendicular to the longitudinal axis along which they extend. In a preferred embodiment, the blocks that preferably are designed as ribs on the outer circumferential surface of the nozzle rod, have a rectangular cross-section perpendicular to the longitudinal axis along which the ribs extend.

In a preferred embodiment, the nozzle rod has two inlet openings for introducing a washing fluid from the outside of the nozzle rod into the rod channel. In a preferred embodiment, the two inlet openings are arranged on opposite sides of the nozzle rod on the circumferential surface of the nozzle rod. In a preferred embodiment the two inlet openings are arranged at the same position along a linear axis along which the nozzle rod extends.

In a preferred embodiment, the circumferential surface of the nozzle rod in the area of the inlet openings is an outer surface of a cylinder. The two inlet openings are arranged on opposite sides in this outer surface of a cylinder.

In an alternative embodiment, the outer circumferential surface of the nozzle rod in the area of the inlet openings is provided by four flat surfaces that are each arranged at 90° to its neighbouring surface. In a preferred embodiment, the nozzle rod has the shape of a dice in the region, where the inlet openings are provided. In a preferred embodiment, the two inlet openings are provided on opposite surfaces of this dice.

In a preferred embodiment, the inlet openings of the nozzle rod are not arranged in line with the fluid inlet channel. In a preferred embodiment, the openings are arranged perpendicular to the fluid inlet channel. This arrangement has the effect that a fluid that is introduced into the housing via the fluid inlet channel cannot directly flow from the fluid inlet channel into an inlet opening of the nozzle rod. The fluid flows into the inlet opening of the nozzle rod from inside the housing. Hence, fluid being introduced via the fluid inlet channel first flows into the housing, whereby the housing can lead to an even distribution of the fluid inside the housing. This can lead to a more smooth flow of the fluid inside the rod channel and out of the nozzle. Both inlet openings being perpendicular to the fluid inlet channel provide for the fluid to come from equal sides into the inlet openings of the nozzle rod and thereby to create a more steady flow. This provides a positive effect on the stability of the spray of the fluid that is ejected from the nozzle.

In a preferred embodiment, the rod channel extends from a lower end of the nozzle rod to a top end of the nozzle rod, whereby the nozzle for ejecting washing fluid from inside the rod channel to the outside of the nozzle rod is arranged at the top end of the nozzle rod. In a preferred embodiment, the top end of the rod channel is closed and the nozzle for ejecting washing fluid from inside the rod channel to the outside of the rod is arranged at the side of the nozzle rod, the washing fluid hence being ejected sideways in relation to the longitudinal extent of the nozzle rod. In a preferred embodiment, the inlet opening or the inlet openings also are arranged on a side of the nozzle rod and are in fluid communication with the rod channel. Preferably, the inlet openings are windows in the outer circumferential area of the nozzle rod that lead from the outside directly to the rod channel that extends inside the nozzle rod.

In a preferred embodiment, the rod channel opens at the bottom end of the nozzle rod in order to allow a pin to extent into the rod channel. In a preferred embodiment, the pin is arranged on the bottom wall of the housing and extends perpendicular to the bottom wall of the housing into the inside of the housing. In a preferred embodiment, the nozzle rod sits on the pin with the pin being arranged in the rod channel.

In a preferred embodiment, as the nozzle rod moves between the retracted position and the extended position, the rod moves along the pin. In a preferred embodiment, the pin protrudes into the rod channel by a larger amount, when the nozzle rod is in the retracted position, than when the nozzle rod is in the extended position. In a preferred embodiment, the pin is arranged inside the rod channel at least by a small amount, when the nozzle rod is in the extended position. In a preferred embodiment, a sealing, preferably an O-ring, is provided on an inner surface of the rod channel.

In a preferred embodiment, the sealing seals against an outer circumferential surface of the pin and the inner circumferential surface of the nozzle rod, when the nozzle rod is in the retracted position, thereby stopping any fluid that is on one side of the sealing, preferably below the sealing to flow past the sealing and into those sections of the rod channel that are on the other side of the sealing, preferably above the sealing. In a preferred embodiment, when the nozzle rod is in the extended position, the sealing is not in contact with an outer circumferential surface of the pin, allowing fluid in the rod channel to flow along the outer circumferential surface of the pin and inside the rod channel and past the seal that is not in contact with the outer circumferential surface of the pin any more. Such an arrangement of a seal and a pin can be used to determine, at which relative position of the nozzle rod relative to the pin the fluid is allowed to further travel along the rod channel past the sealing and towards the nozzle. In a preferred embodiment, as long as the sealing is in contact with the outer circumferential surface of the pin and the inner circumferential surface of the nozzle rod, no fluid travels past the sealing and further along the rod channel towards the nozzle. As the nozzle rod is moved from the retracted position to the extended position, in a preferred embodiment, the seal arranged in the inside of the rod channel travels along the outer circumferential surface of the pin. At a predetermined point the sealing loses engagement with the outer circumferential surface of the pin and hence loses its sealing function, thereby allowing fluid to travel past the seal and further along the rod channel towards the nozzle.

As the nozzle rod is moved back towards the retracted position from the extended position, at a predetermined position, the sealing will come into engagement with the outer circumferential surface of the pin and the inner circumferential surface of the nozzle rod again and hence will start to fulfil its sealing function again. By way of choosing the appropriate length of the pin in relation to the distance that the nozzle rod has to travel from the retracted position to the extended position, it can be determined, at which time along the travel from the retracted position to the extended position of the nozzle rod the fluid is allowed to travel past the sealing and further along the rod channel towards the nozzle. Embodiments can be chosen, where this flow of fluid past the sealing and further along the rod channel and towards the nozzle is allowed only once the rod has reached its extended position or a short time before the nozzle rod has reached its extended position. This can be used to ensure that washing fluid only leaves the nozzle once the nozzle rod has reached its extended position.

The use of a pin that extends into the rod channel of the nozzle rod can also be used to ensure that the nozzle rod takes up a predetermined position. The engagement of the nozzle rod with the pin at its one end and the engagement of the nozzle rod with the inlet opening at another point along the nozzle rod can be used to define two points at which the positioning of the nozzle rod is defined. Given that the nozzle rod preferably is a stiff element, the use of two spaced apart points that determine the position of the nozzle rod provide good means to precisely define the position of the nozzle rod.

In a preferred embodiment, the nozzle of the nozzle rod is arranged in a part of the nozzle rod that extends through the rod opening even in the retracted position of the nozzle rod. In a preferred embodiment, the nozzle rod is hence designed to protrude through the rod opening even in the retracted position with the nozzle being arranged in that part of the nozzle rod that is outside the housing. This can prevent washing fluid that still may be in the rod channel after the ejection of the washing fluid to flow into the inside of the housing.

The vehicle according to the invention has a vehicle surface and a nozzle device according to the invention. In a preferred embodiment, the nozzle device in arranged in front of the vehicle surface.

The system for cleaning a vehicle surface comprises
a fluid reservoir;
a pump in fluid communication with the fluid reservoir;
a nozzle device according to the invention, whereby the fluid inlet channel is in fluid communication with the pump.

A spring can be provided inside the housing to pretension the nozzle rod into a predetermined position, preferably into the retracted position. The spring can be arranged between an upper end wall of the housing and an radially extending rim on the nozzle rod. The radially extending rim on the nozzle rod is preferably provided on the upper part of a two-part nozzle rod and preferably provided above the inner rim of the membrane. Preferably the rim is arranged at such a height of the nozzle rod that the end of the spring that is closer to the membrane is above the outer rim of the membrane even when the nozzle rod is in the retracted position.

In a preferred embodiment the spring constant is chosen in relation to the pressure level that a pump for pumping the washing fluid into the fluid inlet channel can provide. In a preferred embodiment the spring constant is chosen such that the pressure of the washing fluid as it enters into the rod channel is strong enough to move the nozzle rod from the retracted position into the extended position against the restoring force of the spring that is compressed as the nozzle rod moves from the retracted position into the extended position. Once the fluid pressure drops, the restoring force of the spring moves the nozzle rod back into the retracted position from the extended position.

BRIEF DESCRIPTION OF THE DRAWINGS

In the following, the invention will be explained in more detail with reference to Figures that only show possible embodiments of the invention. In the Figures.

FIG. 22 shows a schematic drawing of a system according to the invention.

DETAILED DESCRIPTION

Figure 1:
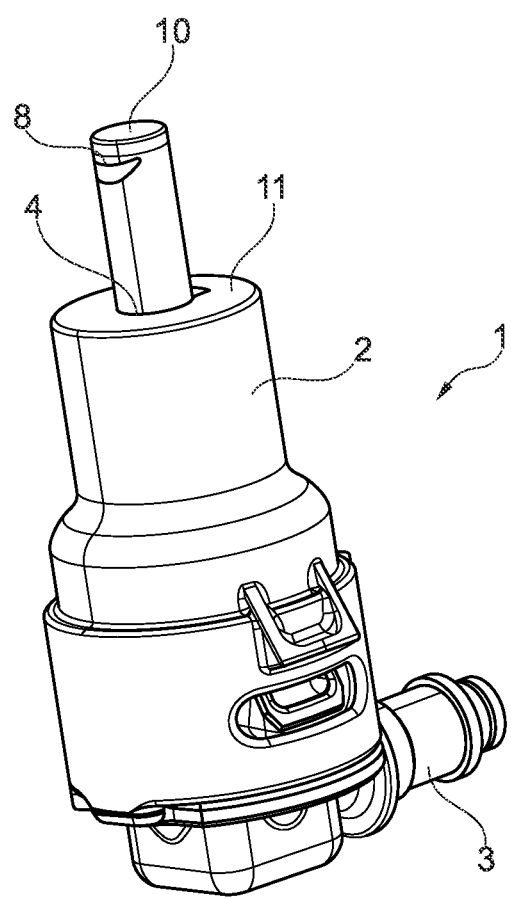
FIG. 1 shows a perspective view onto a telescopic nozzle device for cleaning a vehicle surface with a nozzle rod in an extended position.

The telescopic nozzle device 1 for cleaning a vehicle surface has a housing 2. The housing 2 has a fluid inlet channel 3 suitable for introducing a washing fluid into the housing 2. The housing 2 has a rod opening 4 that opens towards the inside of the housing 2 at one end of the rod opening 4 and opens towards the outside of the housing 2 at a second end of the rod opening 4.

The nozzle device 1 has a hollow nozzle rod 5. The nozzle rod 5 has a rod channel 6 and an inlet opening 7 for introducing washing fluid from outside the nozzle rod 5 into the rod channel 6 and a nozzle 8 for ejecting washing fluid from inside the rod channel 6 to the outside of the nozzle rod 5.

Figure 2:
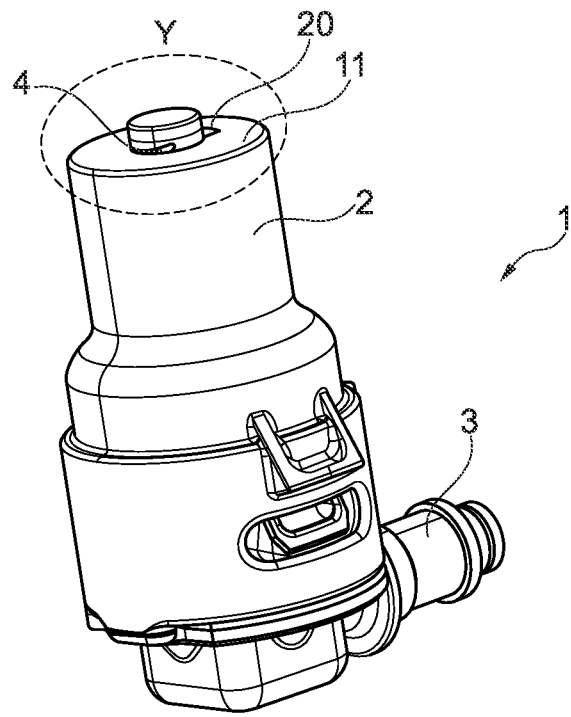
FIG. 2 shows a perspective view onto the telescopic nozzle device of FIG. 1 with the nozzle rod in the retracted position.
Figure 3:
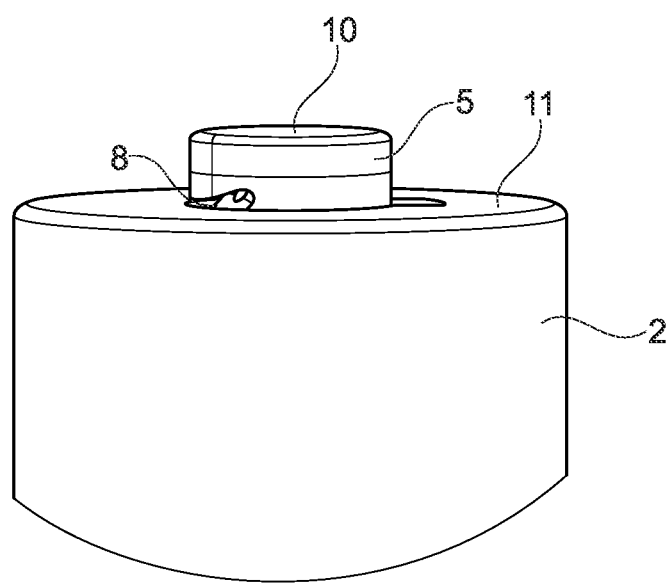
FIG. 3 shows an enlarged perspective view onto the detail Y as highlighted in FIG. 2.
Figure 4:
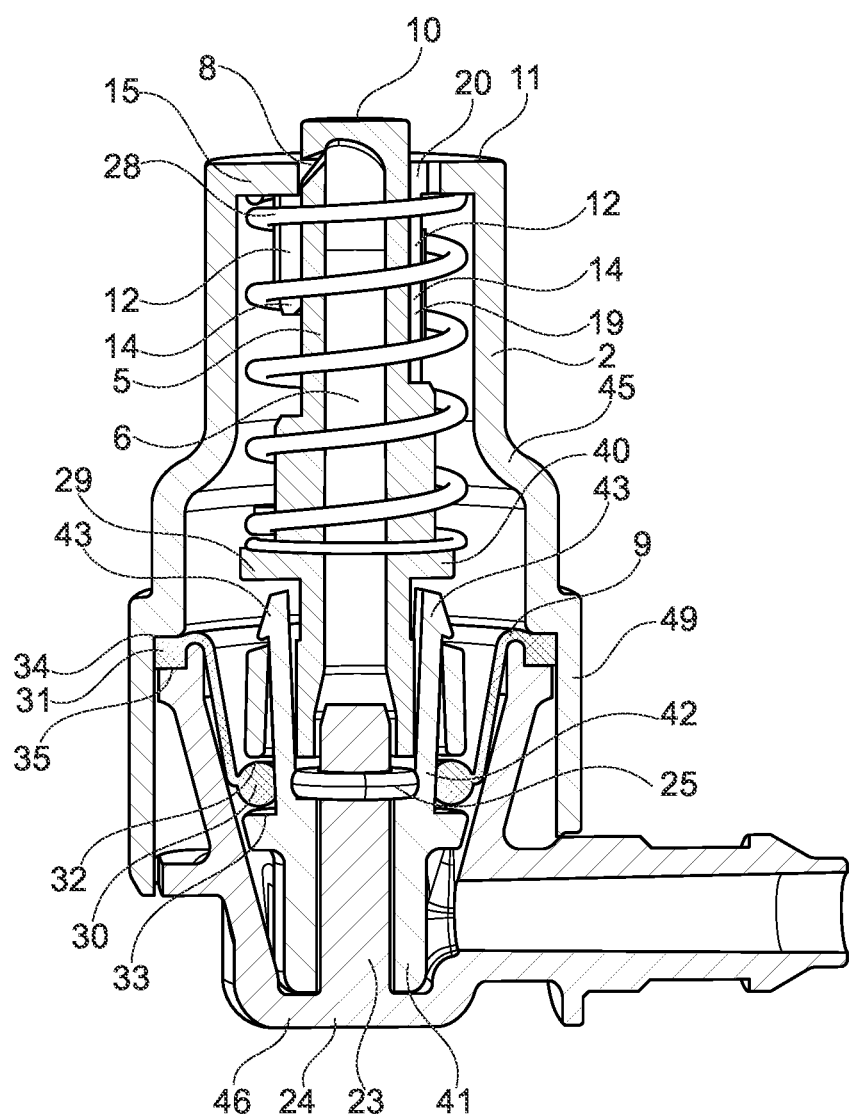
FIG. 4 shows a sectional side view onto the nozzle device of FIG. 1 with the nozzle rod in an retracted position.

The nozzle rod 5 has a retracted position (see e.g. FIG. 2) and an extended position (see e.g. FIG. 1). The nozzle rod 5 is moveable between the retracted position (e.g. FIG. 2) and the extended position (e.g. FIG. 1). As shown in FIG. 1, the nozzle rod 5 extends through the rod opening 4 in the extended position. In the embodiment shown in the Fig., especially as can be seen from FIGS. 2 and 3, the nozzle rod 5 also extends through the rod opening 4 in the retracted position. In the especially preferred embodiment shown in the FIGS. 1 to 3, the nozzle 8 is arranged outside the housing 2 even in the retracted position (FIG. 2, FIG. 3) of the nozzle rod 5. This has the advantage that fluid dripping out of the nozzle 8 in the retracted position of the nozzle rod 5 does not drip into the inside of the housing 2. The space above the membrane 9 (see e.g. FIG. 4) can be kept free from fluid or almost free from washing fluid in such an embodiment. Other embodiments to the one shown in FIGS. 1 to 3 are feasible (not shown in the Fig.), where the top surface 10 of the nozzle 8 is flush with a top surface 11 of the housing 2 when the nozzle rod 5 is in the retracted position. Other embodiments to the one shown in FIGS. 1 to 3 are feasible (not shown in the Fig.), where the top surface 10 of the nozzle 8 is arranged the top surface 11 of the housing 2 when the nozzle rod 5 is in the retracted position.

The nozzle device 1 has a guiding system that guides the nozzle rod 5 as it moves from the retracted position to the extended position. The guiding systems comprises a housing guide that is arranged inside the housing 2, the housing guide having a housing guide surface. The guiding systems also comprises a rod guide that forms part of the nozzle rod 5 and has a rod guide surface 13 that can come into contact with the housing guide surface 12 to guide the nozzle rod 5 as it moves from the retracted position to the extended position.

Figure 13:
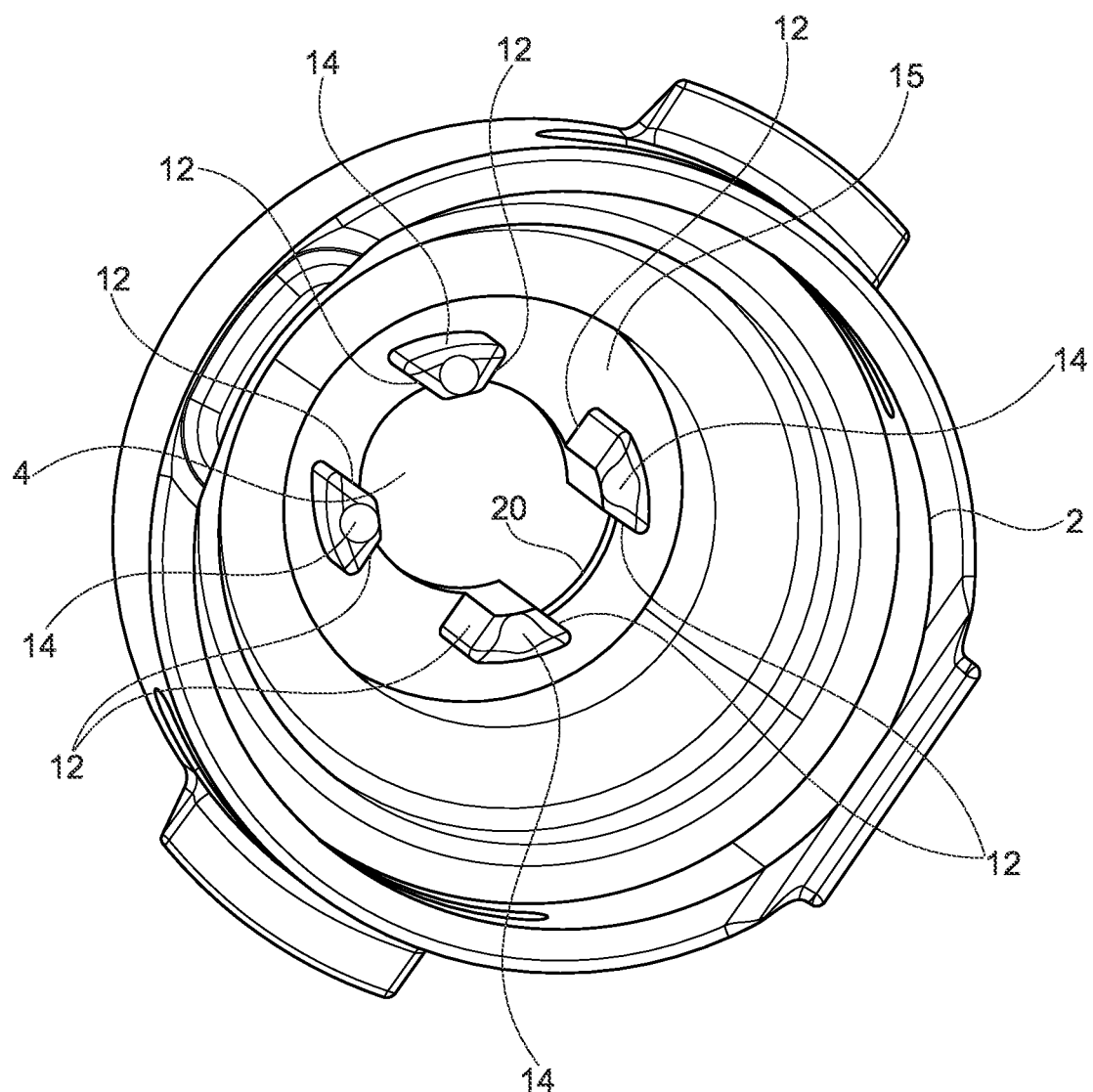
FIG. 13 shows a perspective view into an upper part of the housing.
Figure 14:
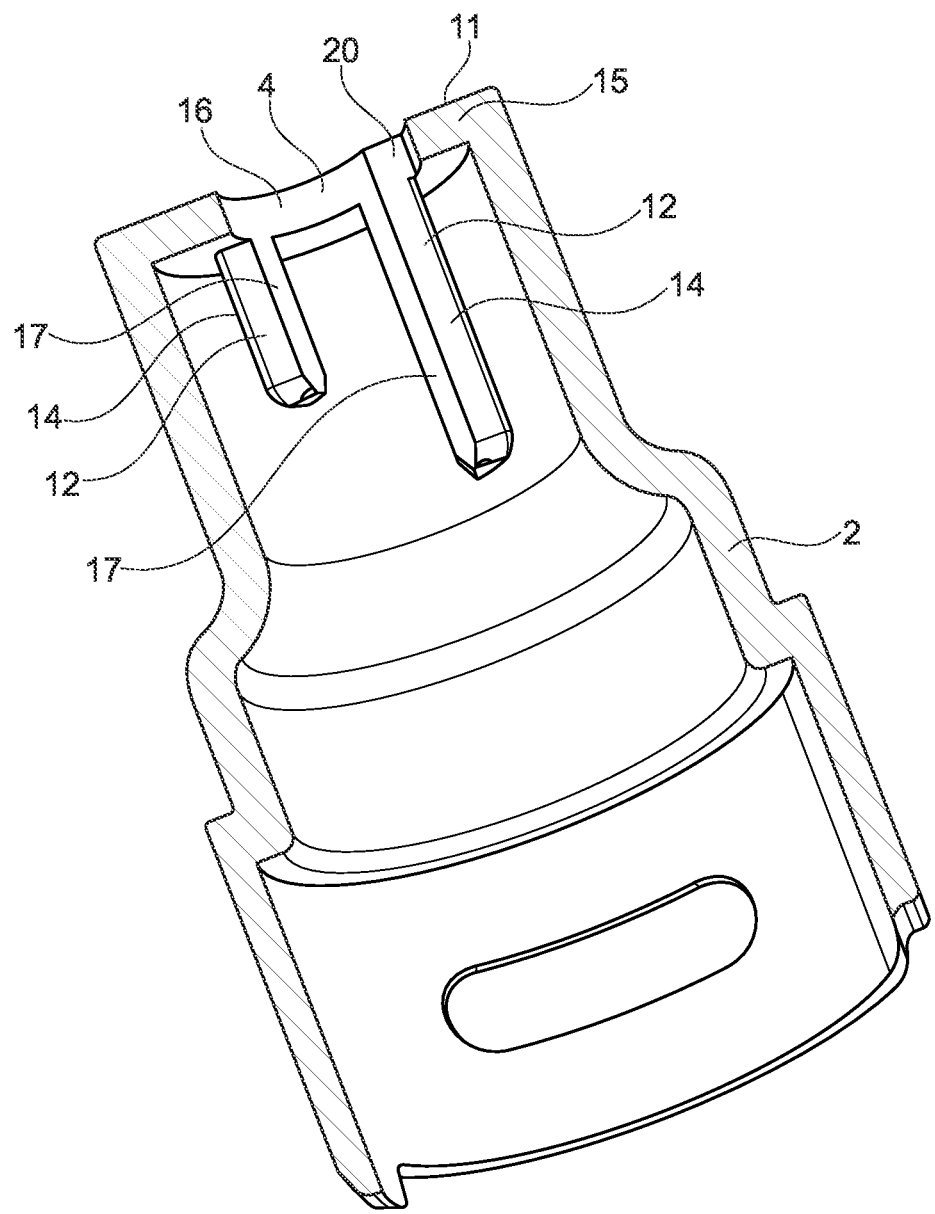
FIG. 14 shows a perspective sectional view of the upper part of the housing.

As can be best seen from FIGS. 13 and 14, the housing guide has several lugs 14 (in the embodiment shown: four lugs 14) that protrude from an inward surface of a housing wall 15 into the inside of the housing 2, whereby on each side of the respective lug 14 a housing guide surface 12 is provided by a surface of the respective lug 14. As can best be seen from FIG. 14, the rod opening 4 is arranged in the housing wall 15 from which housing wall 15 the lugs 14 protrude. In the embodiment shown in FIG. 14, the rod opening 4 is delimited by a rod opening wall 16 and the respective lug 14 has a surface 17 that is flush with a part of the rod opening wall 16.

Figure 15:
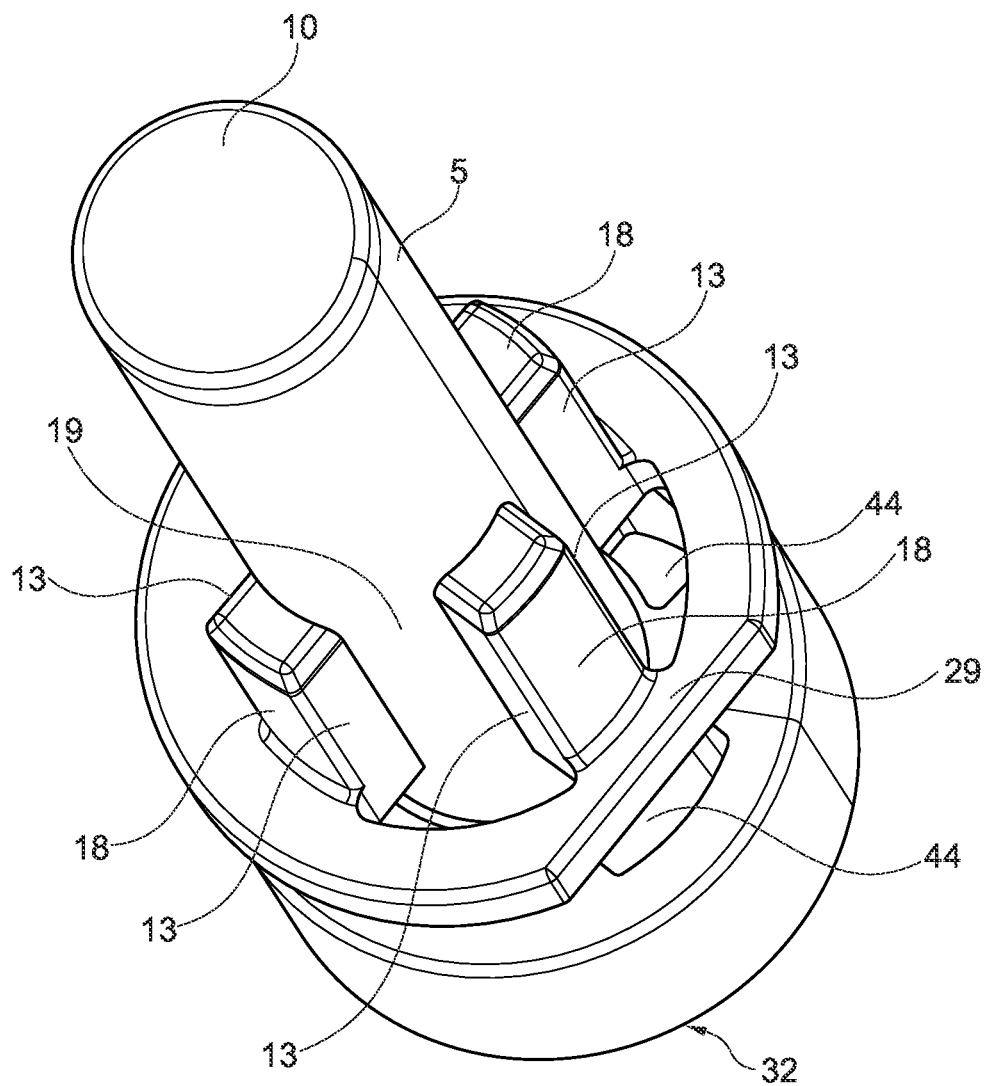
FIG. 15 shows a perspective view from the top onto the upper element and the lower element of the nozzle rod the membrane not being shown to have a better view onto the relative arrangement of the upper element and the lower element of the nozzle rod.
Figure 16:
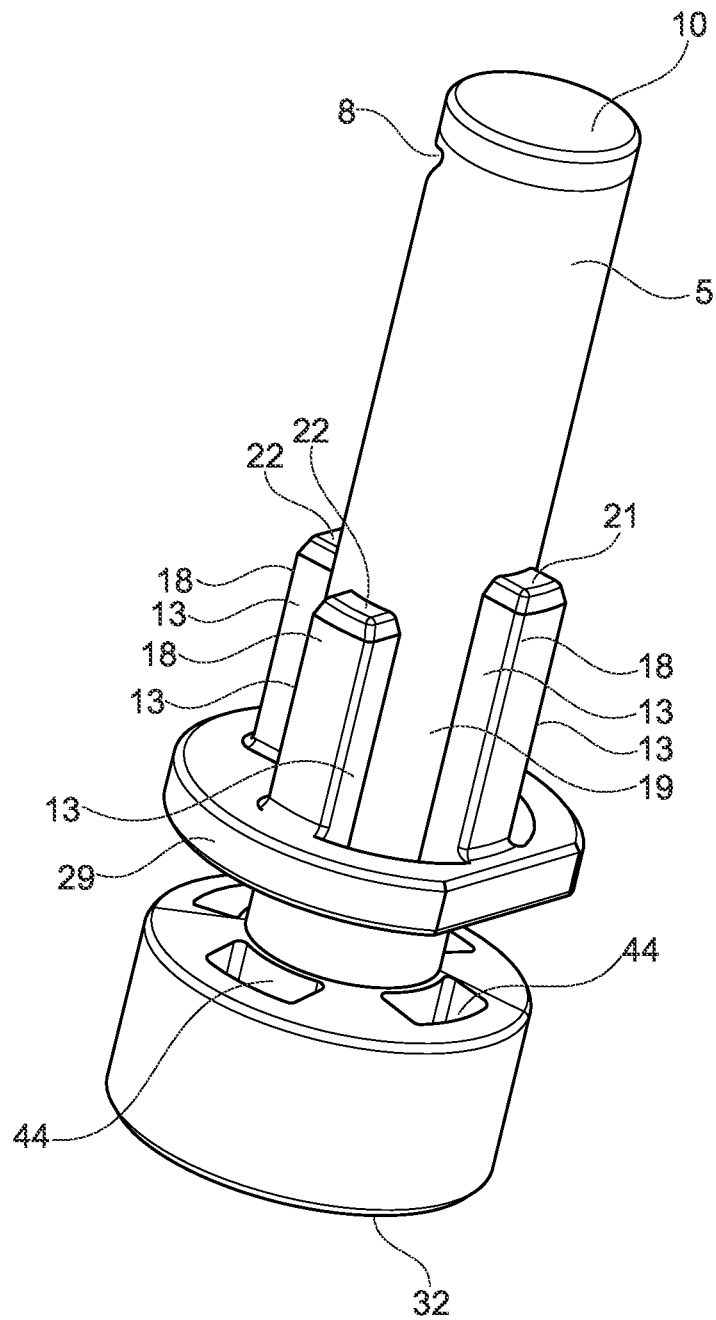
FIG. 16 shows a perspective view taken from a different view point onto the elements shown in FIG. 15.
Figure 17:
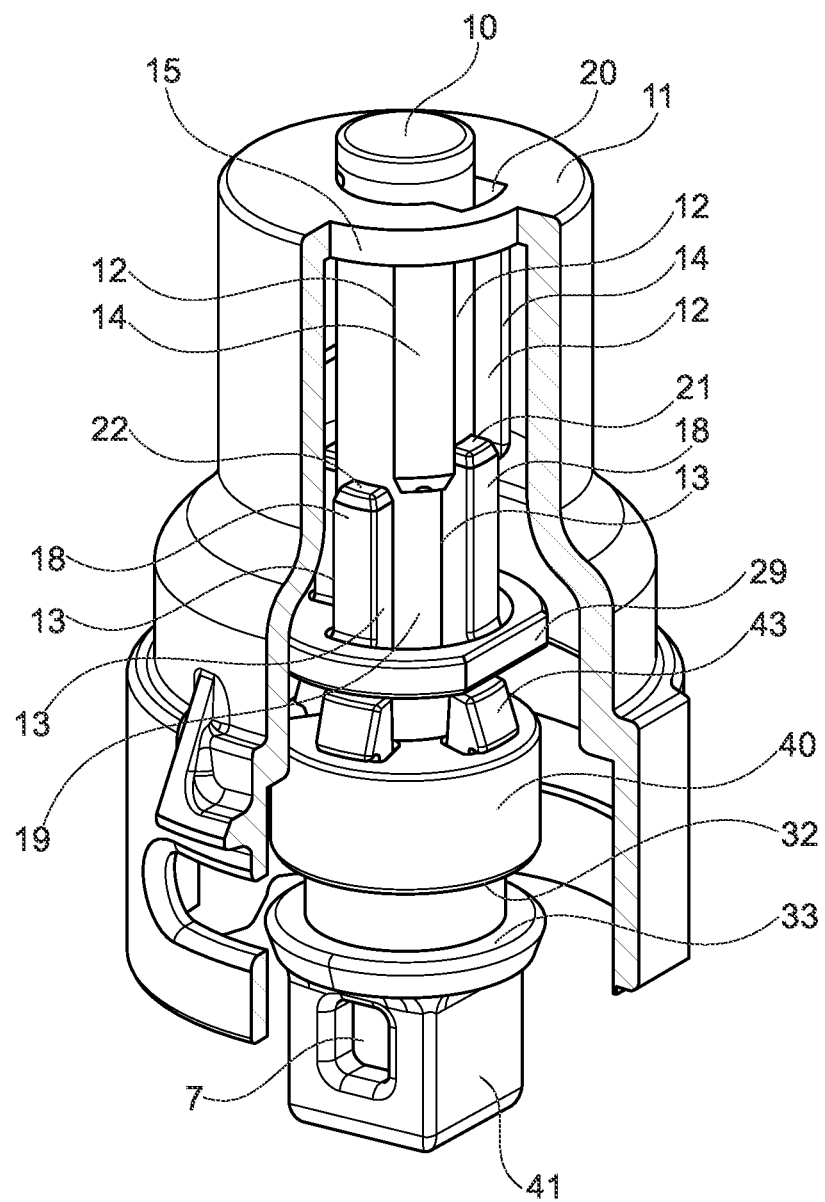
FIG. 17 shows a perspective view onto the nozzle device of FIG. 1 with the nozzle rod in a retracted position, whereby the housing is shown in a partially sectional view giving view onto the elements arranged inside the housing, only an upper element of the housing being shown for a better view onto the elements arranged inside the housing.

As best can be seen from FIGS. 15 and 16, the housing guide has several blocks 18 arranged at an outer circumferential surface 19 of the nozzle rod 5, whereby each block 18 provides a rod guide surface 13. In the embodiment shown in FIGS. 15 and 16, one of the several blocks 18 is longer than the remaining ones of the several blocks 18.

Figure 5:
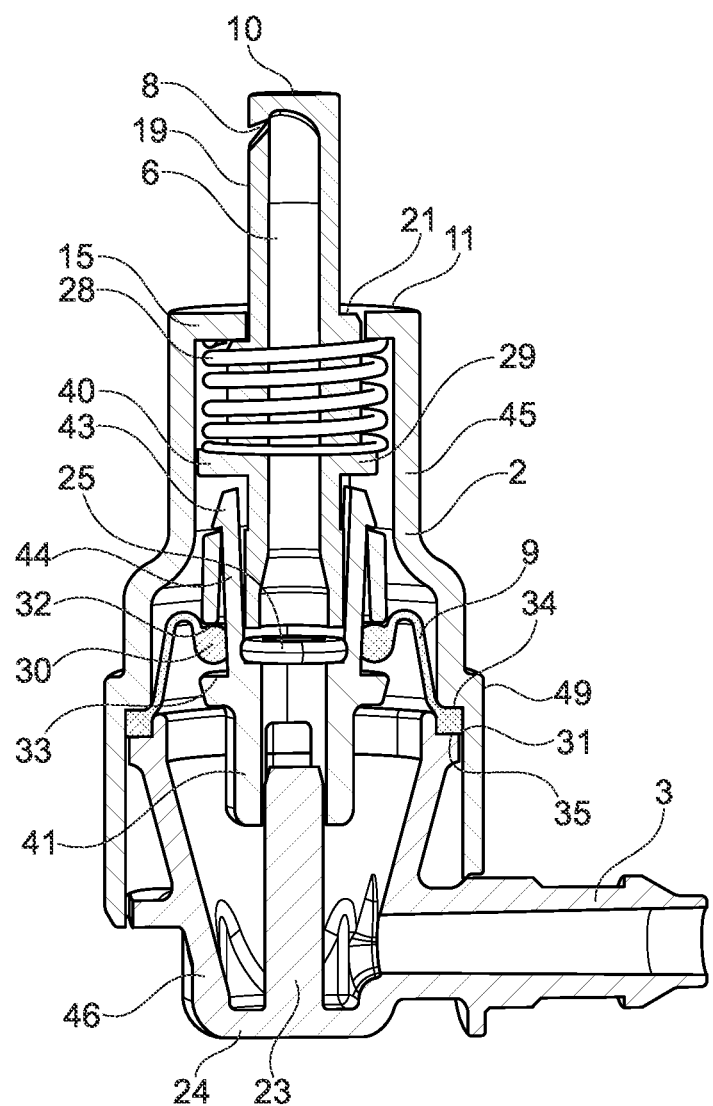
FIG. 5 shows a sectional side view onto the nozzle device of FIG. 1 with the nozzle rod in an extended position.
Figure 6:
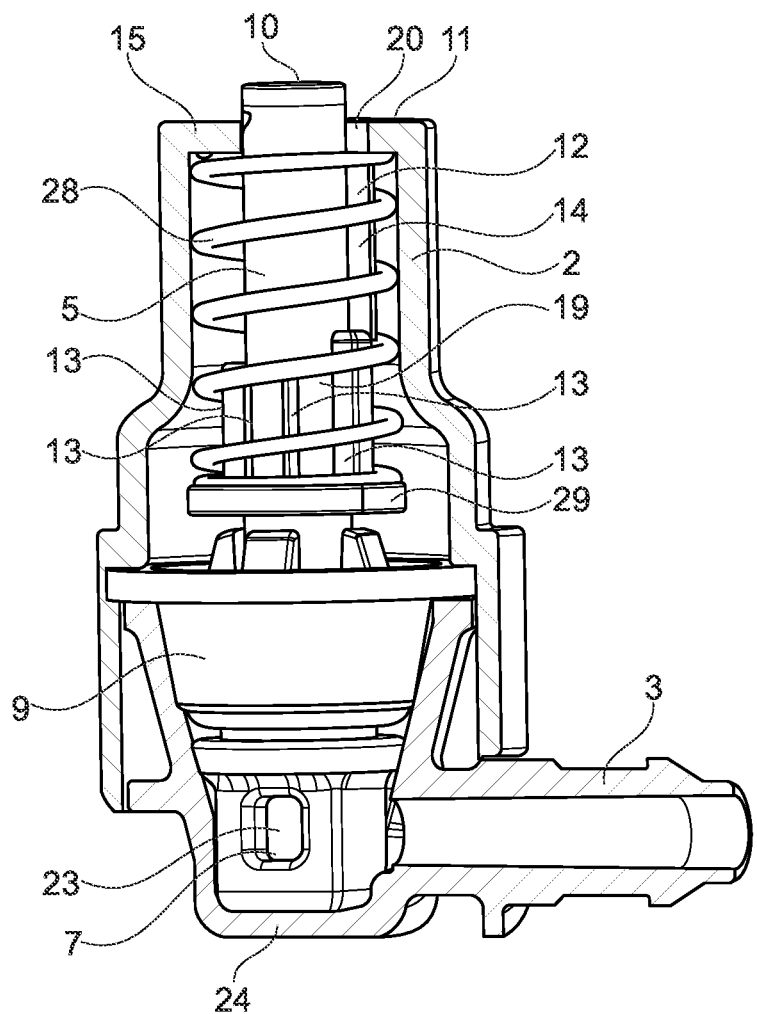
FIG. 6 shows a perspective view onto the nozzle device of FIG. 1 with the nozzle rod in a retracted position, whereby the housing is shown in a sectional view giving view onto the elements arranged inside the housing.
Figure 7:
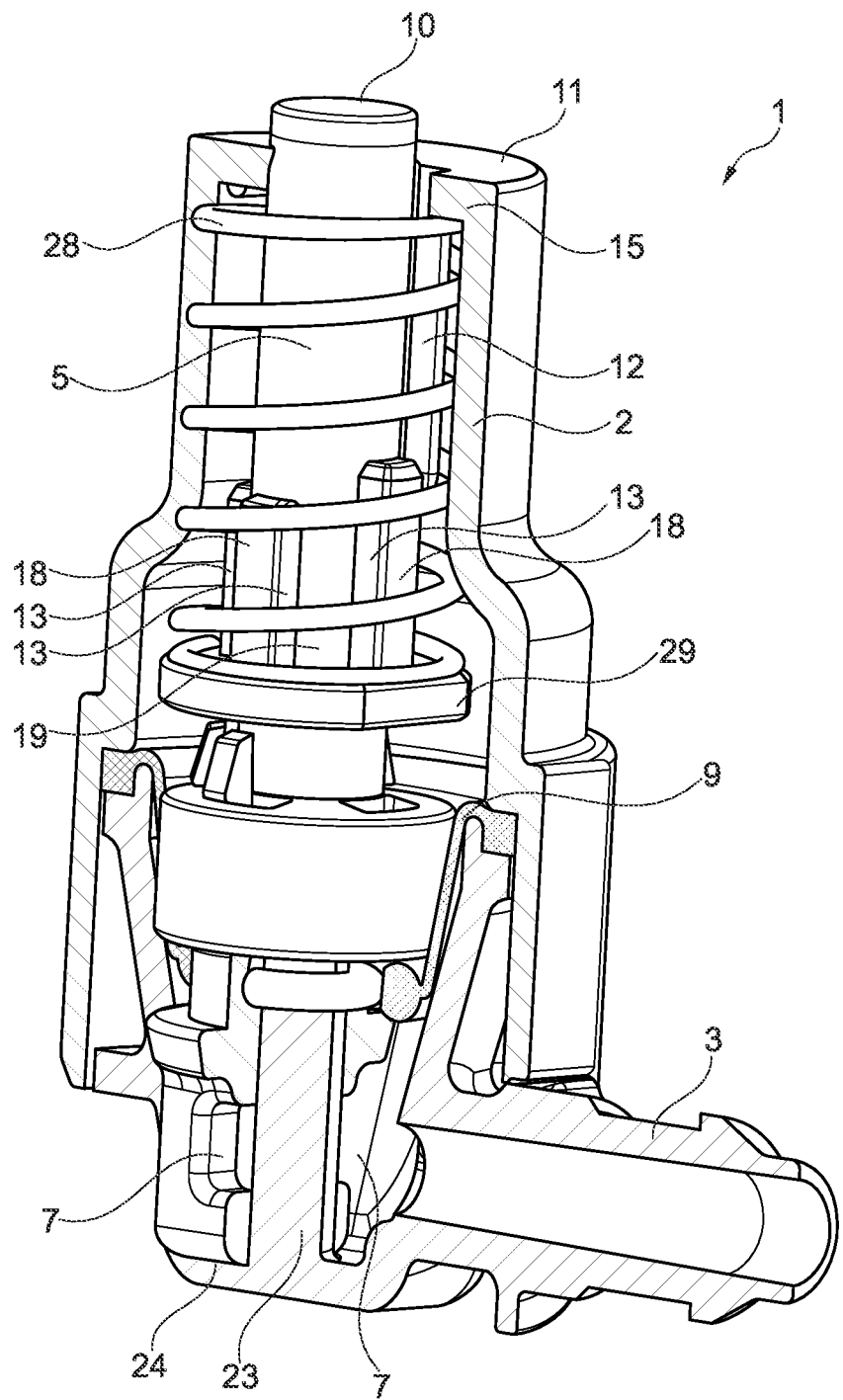
FIG. 7 shows a perspective view onto the nozzle device of FIG. 1 with the nozzle rod in a retracted position, whereby the housing is shown in a sectional view giving view onto the elements arranged inside the housing and whereby a lower part of the nozzle rod is also shown in a partially sectional view giving view onto a pin arranged inside the lower part of the nozzle rod.
Figure 18:
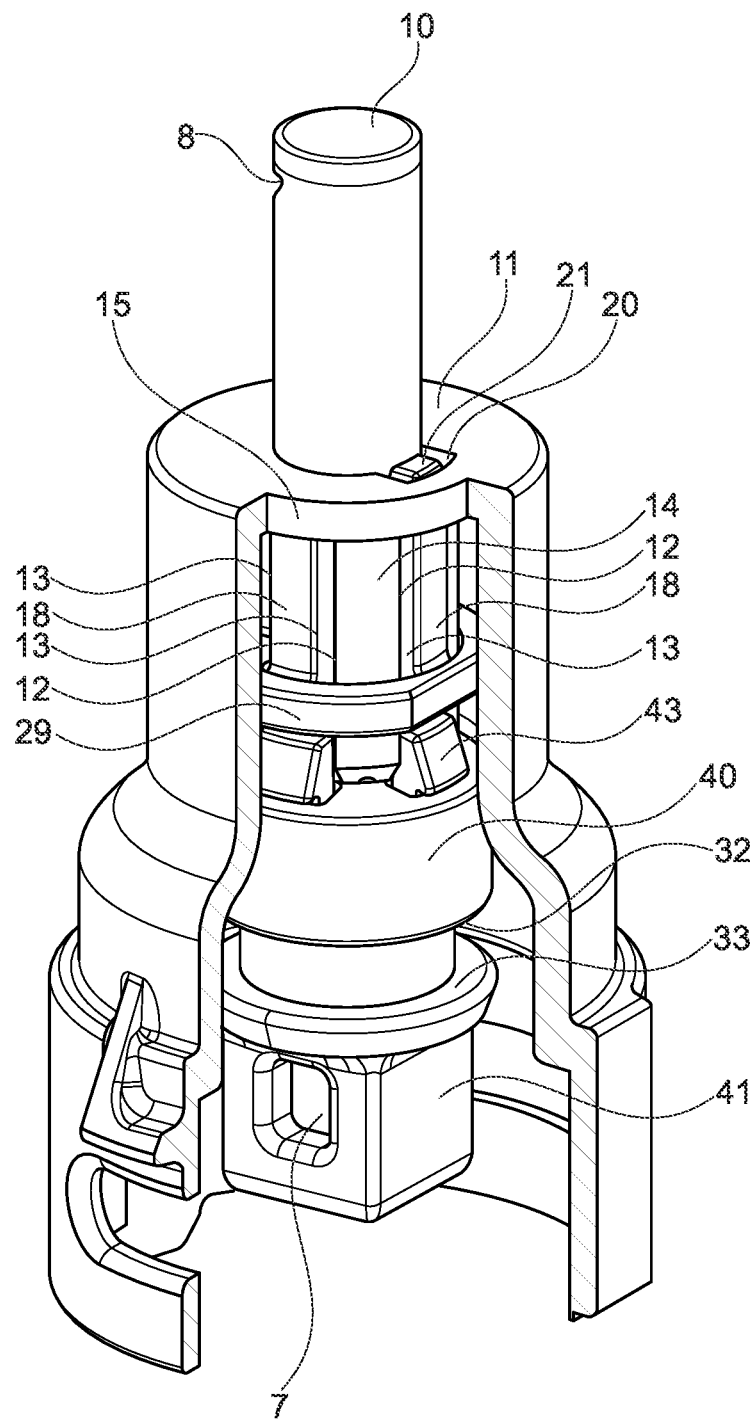
FIG. 18 shows a perspective view onto the elements shown in FIG. 17 with the nozzle rod now in the extracted position.
Figure 19:
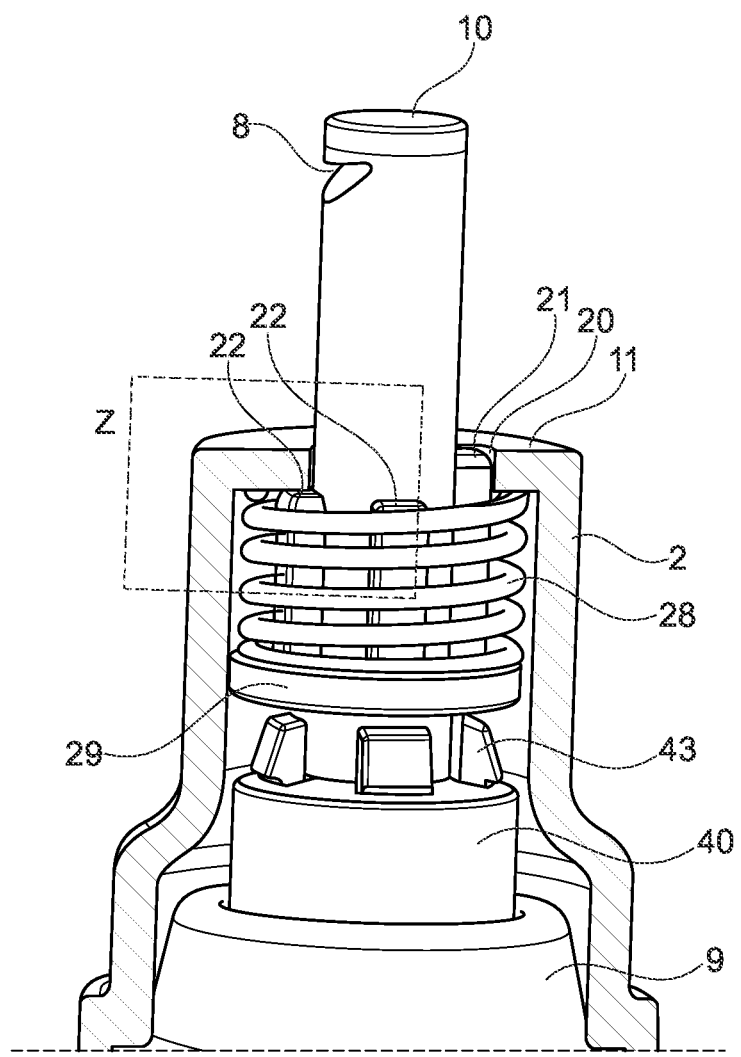
FIG. 19 shows a perspective view onto an upper part of nozzle device of FIG. 1 with the nozzle rod in a extracted position, whereby the housing is shown in a partially sectional view giving view onto the elements arranged inside the housing.

As can for example be seen from FIG. 18 or FIG. 5 in the extended position of the nozzle rod 5 a part of the rod guide, namely a part of the block 18 that is longer than the other blocks 18 is arranged inside the rod opening 4. The rod opening 4 in the embodiment shown has a circular shape but has a recess 20, that widens the circular shape and provides space for the block 18 to extend into the rod opening 4. As can be seen from FIGS. 5 and 18, the top surface 21 of the block 18 is flush with the top surface 11 of the housing 2.

In the extended position of the nozzle rod 5 a part of the rod guide, namely the top surface 22 of the blocks 18 that are smaller rests against an inward surface of a housing wall 15 blocking further movement of nozzle rod 5 out of the housing 2.

The membrane 9 is arranged between the nozzle rod 5 and the housing 2. The membrane 9 terminates in an inner rim 30 that is connected to an outside surface of the nozzle rod 5. The membrane 9 terminates in an outer rim 31 that is attached to the housing 2. The inner rim 30 of the membrane is provided by a hollow cylinder. The hollow cylinder that provides the inner rim 30 is held between a blocking surface 32 of a first part (the upper part 40) of the nozzle rod 5 and a blocking surface 33 of a second part (the lower part 41) of the nozzle rod 5. The upper part 40 has a rim-shaped, radially extending blocking surface 32. The lower part 41 has a rim-shaped, radially extending blocking surface 33, whereby the blocking surface 32 is facing the blocking surface 33. The blocking surface 32 is provided by a rim-shaped, radially extending end surface of the upper part 40. The lower part 41 has a tube-shaped section 42, whereby the blocking surface 33 radially extends in a rim-shaped manner from the outer circumference of the tube-shaped section 42. The tube-shaped section 42 extends into the hollow cylinder that makes up the inner rim 30. Fingers 43 extend from the tube-shaped section 42. The fingers 43 have wedge-shaped ends that can be used to snap-fit the fingers 43 into openings 44 provided in that part of the upper part 40.

The outer rim 31 is provided by a hollow cylinder. The hollow cylinder that provides the outer rim 31 is held between a blocking surface 34 of a first part (upper part 45) of the housing 2 and a blocking surface 35 of a second part (lower part 46) of the housing. The upper part 45 has the rim-shaped, radially extending blocking surface 34 and the lower part 46 has the rim-shaped, radially extending blocking surface 35, whereby the blocking surface 34 is facing the blocking surface 35. The blocking surface 35 is provided by a rim-shaped, radially extending end surface of the lower part 46. The upper part 45 has a tube-shaped section 49, whereby the blocking surface 34 radially extends in a rim-shaped manner from the inner circumference of the tube-shaped section 49, for example like a step in the tube-shaped section 49. The tube-shaped section 49 extends along the outside of the hollow cylinder that makes up the outer rim 31 of the membrane.

Figure 8:
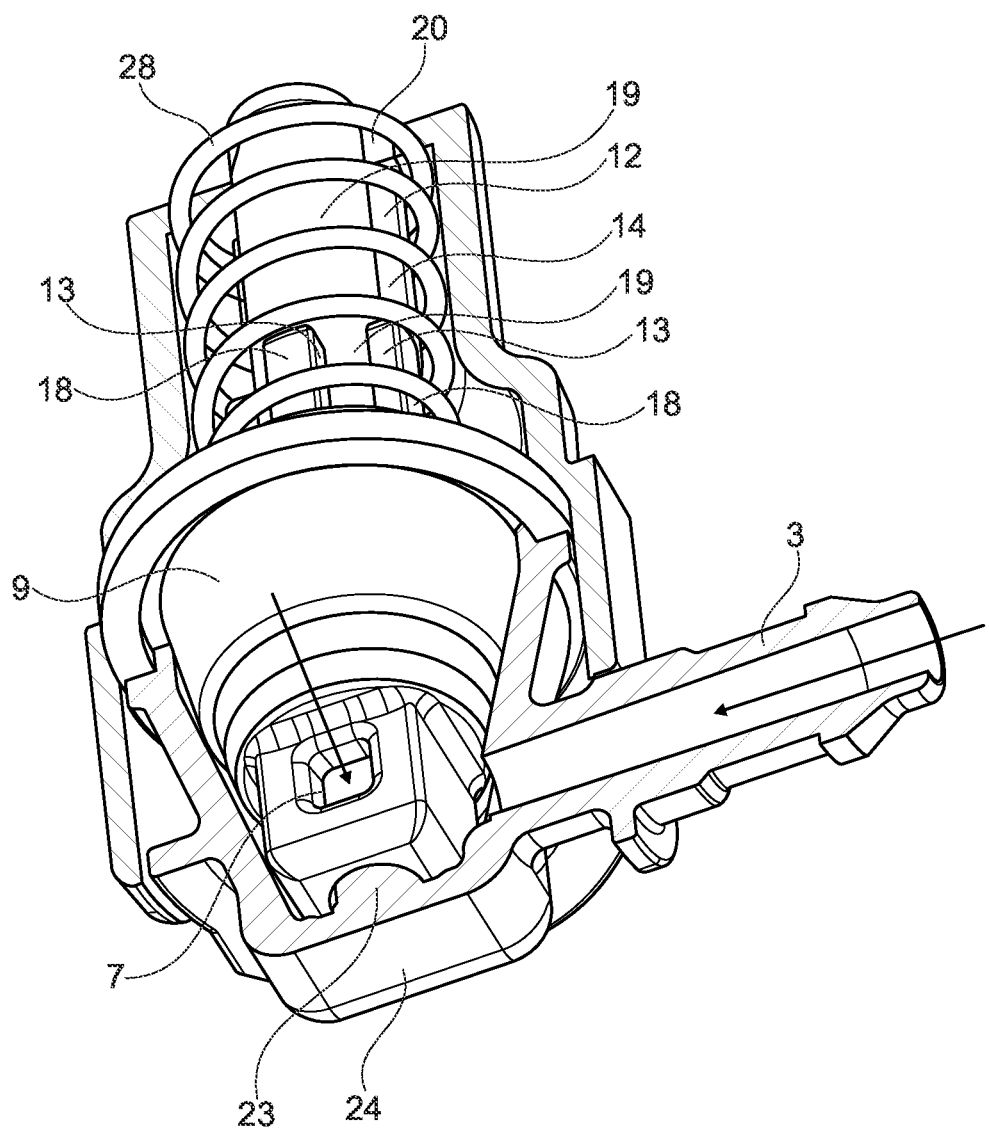
FIG. 8 shows a perspective view taken from a different perspective as FIG. 6, the view being onto the nozzle device of FIG. 1 with the nozzle rod in a retracted position, whereby the housing is shown in a sectional view giving view onto the elements arranged inside the housing.
Figure 9:
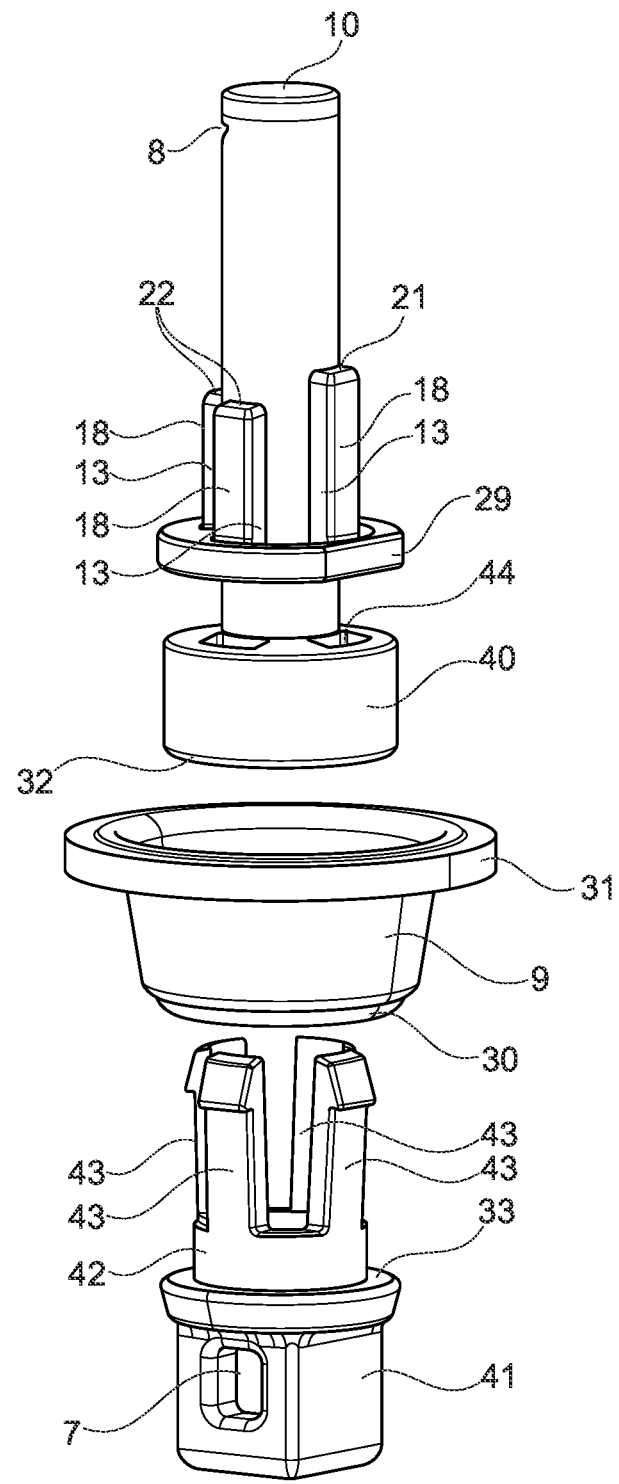
FIG. 9 shows an exploded perspective view of an upper element, a membrane and a lower element that together from the nozzle rod prior to assembly.
Figure 10:
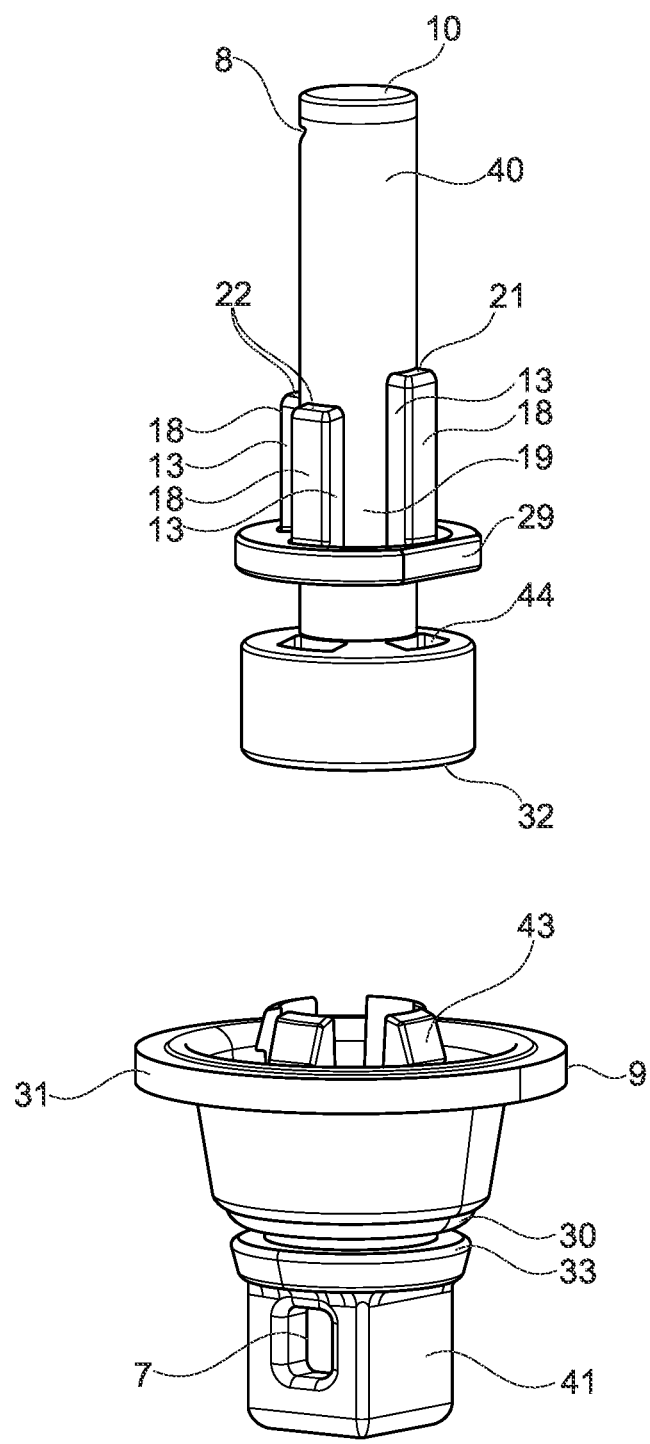
FIG. 10 shows an exploded perspective view onto the elements of FIG. 9 with the membrane placed on the lower element as a first step of assembly.
Figure 11:
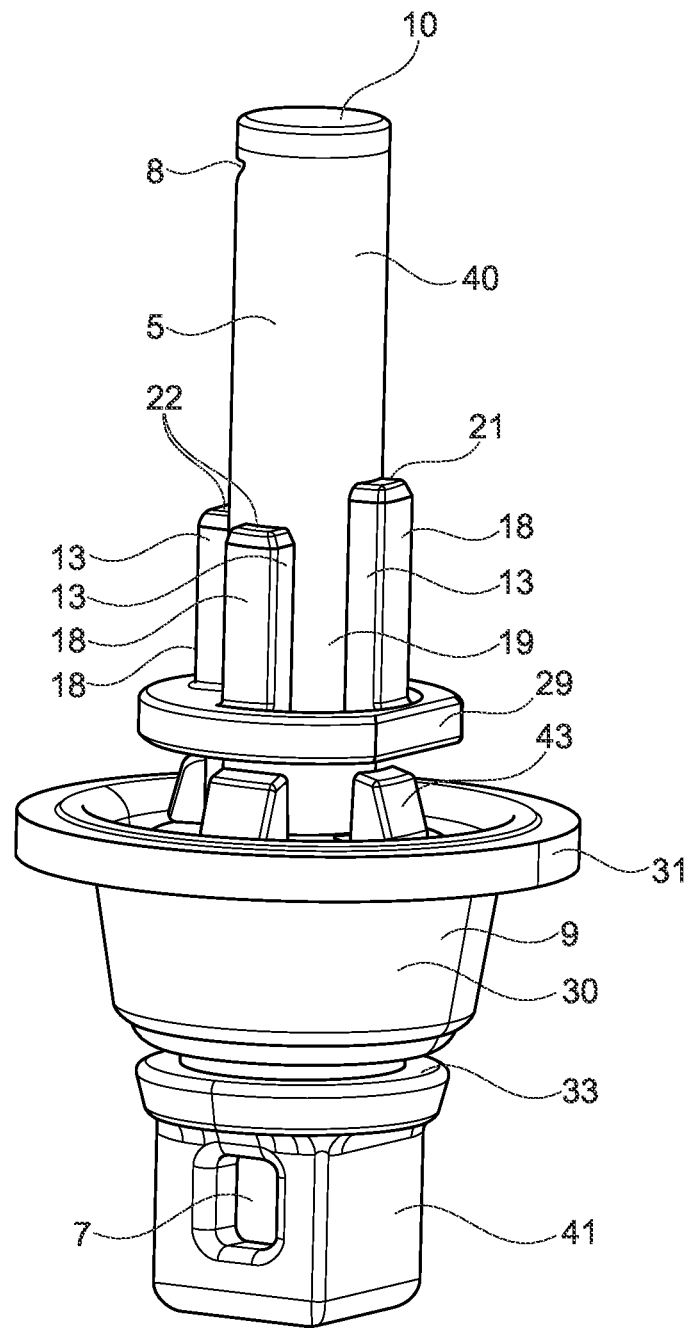
FIG. 11 shows an exploded perspective view onto the elements of FIG. 9 with the upper element being placed onto the membrane that is placed on the lower element as a second step of assembly.
Figure 11A:
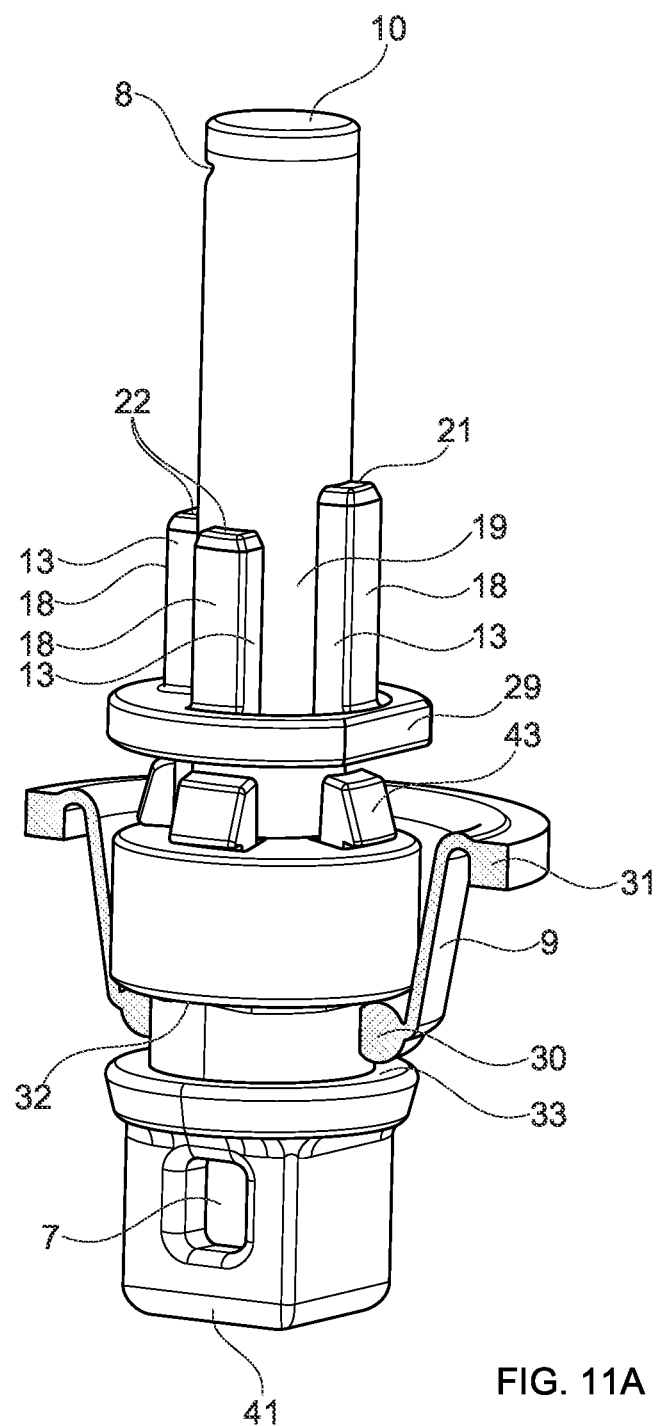
FIG. 11A shows another exploded perspective view onto the elements of FIG. 9 with the upper element being placed onto the membrane that is placed on the lower element as a second step of assembly.
Figure 12:
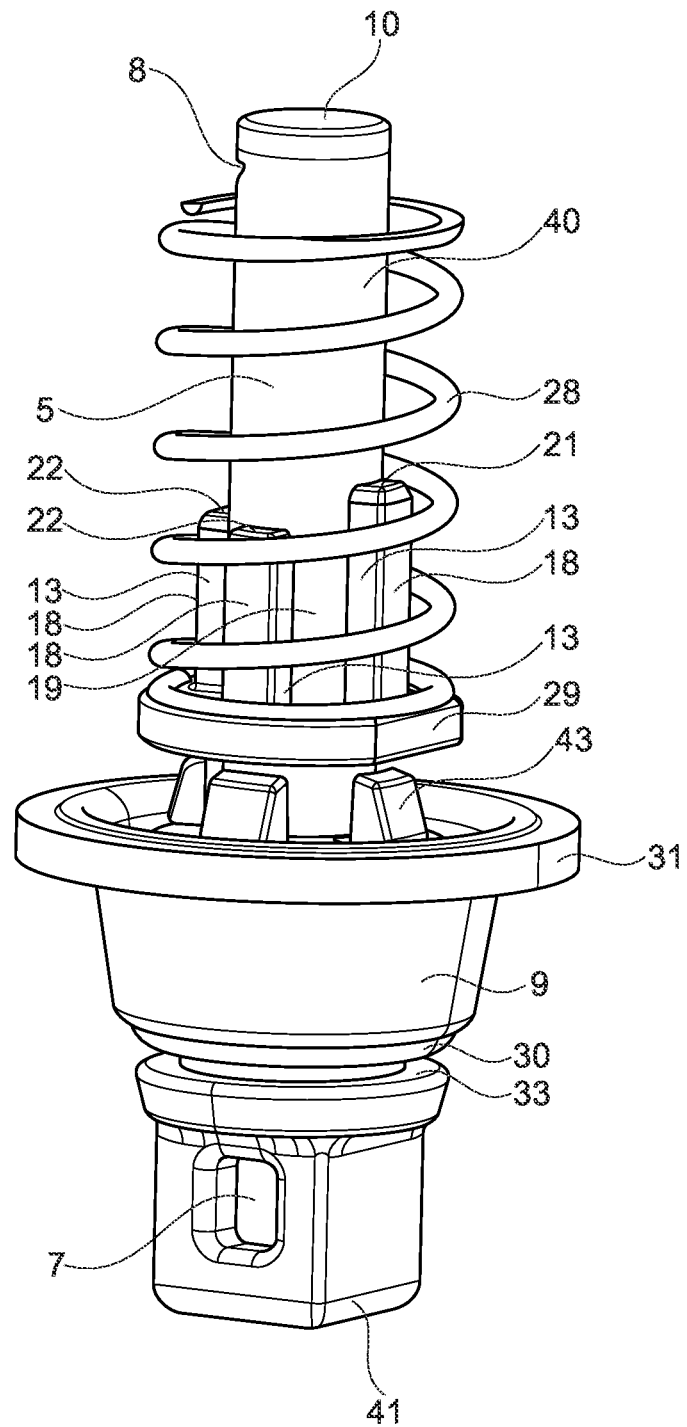
FIG. 12 shows an exploded perspective view onto the elements of FIG. 9 with the upper element, the membrane and the lower element being assembled to form the nozzle rod with a coil spring being placed on the nozzle rod.

Two the inlet openings 7 are provided. The inlet openings 7 are not arranged in line with the fluid inlet channel 3. The inlet openings 7 are arranged perpendicular to the fluid inlet channel 3 as indicated by the arrows in FIG. 8.

The rod channel 6 extends from a lower end of the nozzle rod 5 to a top end of the nozzle rod 5, whereby the nozzle 8 for ejecting washing fluid from inside the rod channel 6 to the outside of the nozzle rod 5 is arranged at the top end of the nozzle rod 5. The top end of the rod channel 6 is closed and the nozzle 8 for ejecting washing fluid from inside the rod channel 6 to the outside of the nozzle rod 5 is arranged at the side of the nozzle rod 5, the washing fluid hence being ejected sideways in relation to the longitudinal extent of the nozzle rod 5. The inlet openings 7 also are arranged on a side of the nozzle rod 5 and are in fluid communication with the rod channel 6. The inlet openings 7 are windows in the outer circumferential area of the nozzle rod 5 that lead from the outside directly to the rod channel 6 that extends inside the nozzle rod 5.

The rod channel 6 opens at the bottom end of the nozzle rod 5 in order to allow a pin 23 to extent into the rod channel 6. The pin 26 is arranged on the bottom wall 24 of the housing 2 and extends perpendicular to the bottom wall 24 into the inside of the housing 2. The nozzle rod 5 sits on the pin 23 with the pin 23 being arranged in the rod channel 6. As nozzle rod 5 moves between the retracted position and the extended position, the nozzle rod 5 moves along the pin 23. The pin 23 protrudes into the rod channel 6 by a larger amount, when the nozzle rod 5 is in the retracted position, than when the nozzle rod 5 is in the extended position. The pin 23 is arranged inside the rod channel by a small amount, when the nozzle rod 5 is in the extended position (see e.g. FIG. 5). A O-ring 25 is provided on an inner surface of the rod channel 6. The O-ring 25 seals against an outer circumferential surface of the pin 23 (see e.g. FIG. 4), when the nozzle rod 5 is in the retracted position, thereby stopping any fluid that is on one side of the sealing (the lower side of the sealing) to flow past the sealing and into those sections of the rod channel 6 that are on the other side of the sealing (above the sealing). When the nozzle rod 5 is in the extended position, the O-ring 25 is not in contact with an outer circumferential surface of the pin 23 (see e.g. FIG. 5), allowing fluid in the rod channel 6 to flow along the outer circumferential surface of the pin 23 and inside the rod channel 6 and past the O-ring 25 that is not in contact with the outer circumferential surface of the pin 23 anymore.

A spring 28 is provided inside the housing 2 to pretension the nozzle rod 5 into the retracted position. The spring is be arranged between an upper end wall 15 of the housing 2 and an radially extending rim 29 on the nozzle rod 5. The radially extending rim 29 on the nozzle rod 5 is provided on the upper part 40 and provided above the inner rim 30 of the membrane 9. The rim 29 is arranged at such a height of the nozzle rod 5 that the end of the spring 28 that is closer to the membrane 9 is above the outer rim 31 of the membrane 9 even when the nozzle rod 5 is in the retracted position (see e.g. FIG. 4).

Figure 20:
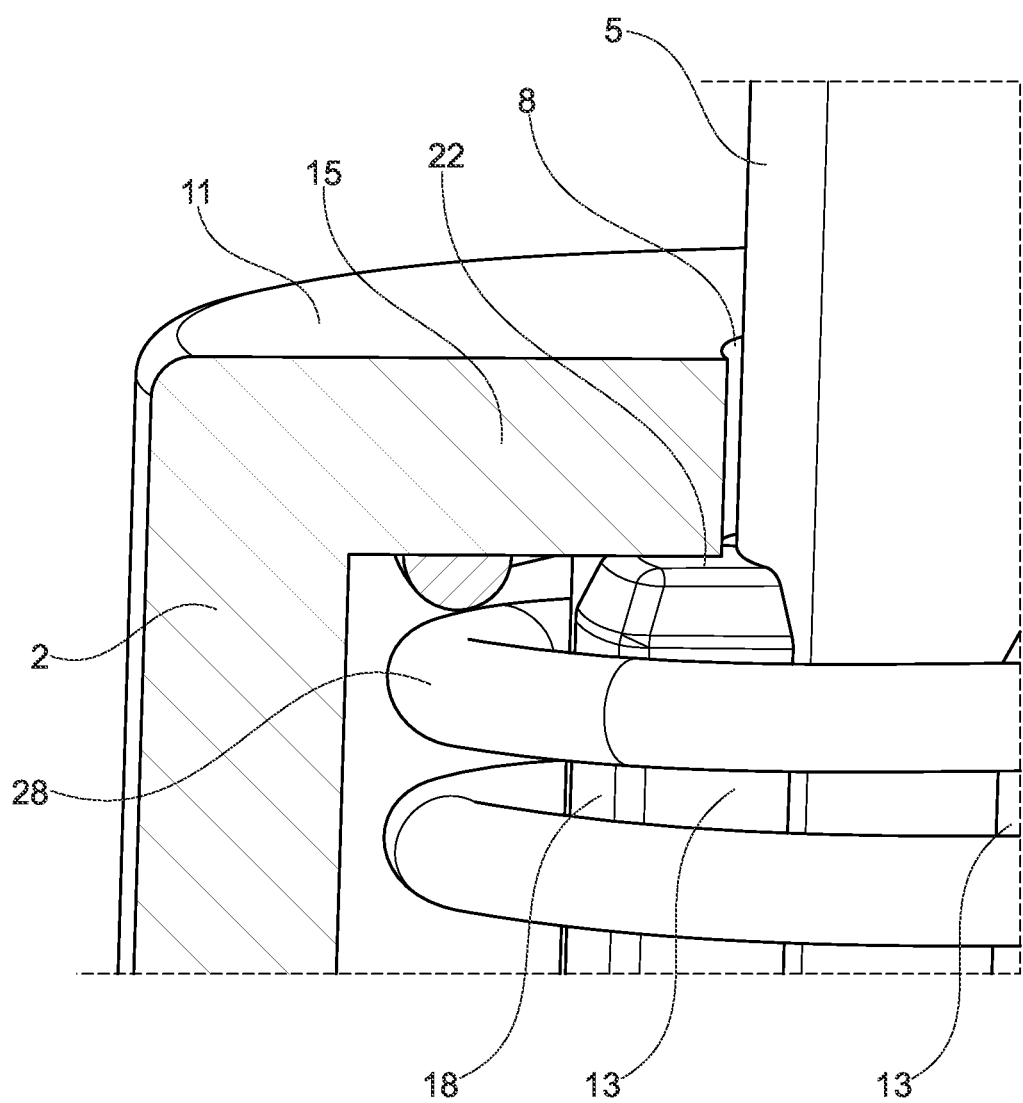
FIG. 20 shows an enlarged perspective view onto the detail Z shown in FIG. 19.

FIG. 20 shows that the surface 22 of the block 18 rests against the inward surface of the housing wall 15 and prevents the nozzle rod 5 from further moving out of the housing 2.

Figure 21:
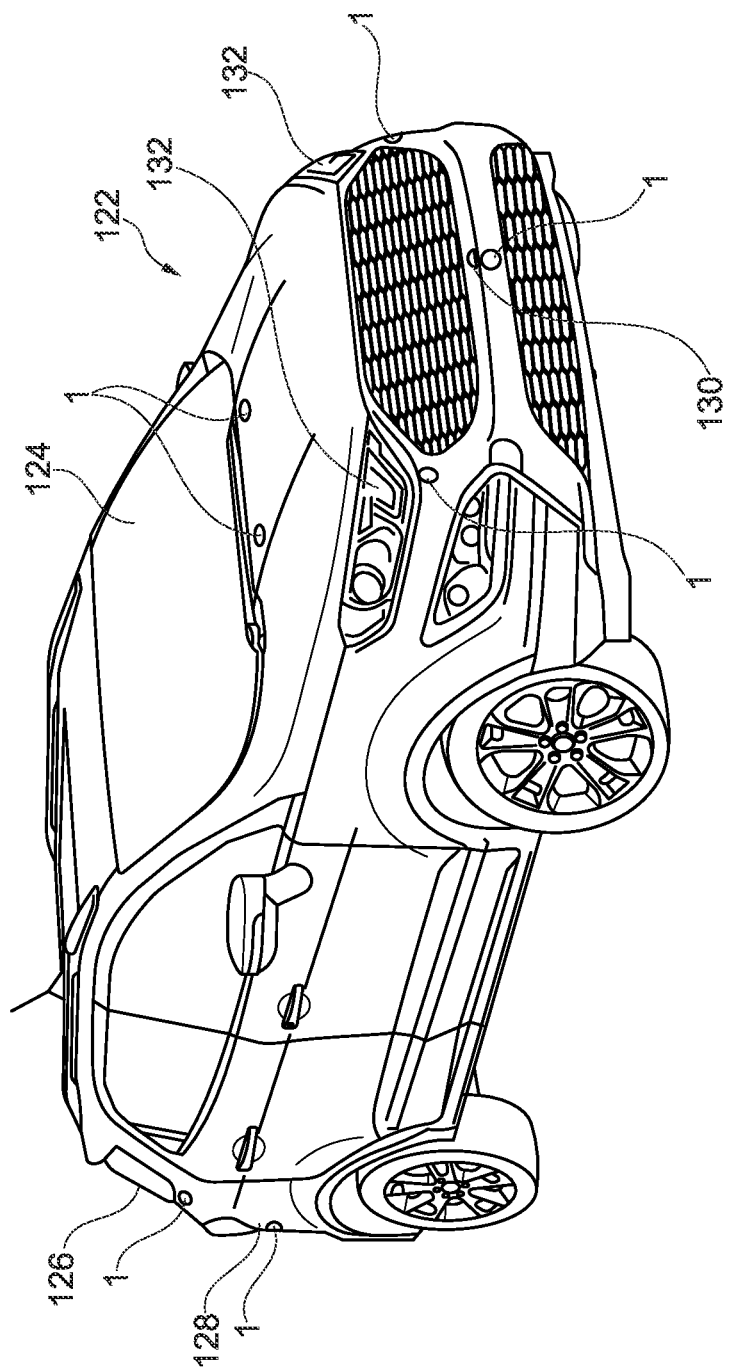
FIG. 21 shows a perspective view onto a vehicle being equipped with several nozzle devices according to the invention.

FIG. 21 shows a vehicle 122 comprising several vehicle surfaces and several nozzle devices 1. The vehicle 122 can comprise various vehicle surfaces, some examples of which include a front windshield 124, a rear windshield 126, a camera 128, a sensor 130, and headlights or headlamps 132. One or more telescoping device 1, can be mounted in various locations on the vehicle 122 to the clean various vehicle surfaces 124-132. For example, the telescoping device 1 can be hood mounted, under hood mounted, cowl screen mounted, or wiper arm mounted. In another example, the telescoping device 1 can be integrated in or mounted on a rear end spoiler or a center high-mounted stop lamp (CHMSL). It is noted that the telescoping devices 1 are schematically represented in FIG. 21, and are not necessarily drawn to scale relative to the vehicle 122 or the various vehicle surfaces. It is also noted that the number and location of the telescoping devices 1 for the vehicle 122 can vary from the illustrated embodiment, and it will be understood by those skilled in the art that the vehicle 122 can use different numbers of telescoping devices 1 and in different locations in accordance with the principles of the present disclosure. In addition, although the illustrated embodiment of the vehicle 122 includes one rear camera 128 and one front sensor 130, it will be understood by those skilled in the art that the vehicle 122 can use different numbers of cameras and sensors in various locations on the vehicle 122 in accordance with the principles of the present disclosure. In FIG. 21, the telescoping devices 1 are in the retracted position and the top surface 10 of the nozzle rod 5 can be flush with or otherwise form a contiguous or continuous surface with the vehicle 122. In the extended position, the nozzle rod 5 is extended outwardly from the vehicle surface and the nozzle 8 can face the surface to be cleaned, i.e. the front windshield 124, a rear windshield 126, a camera 128, a sensor 130, and headlights or headlamps 132.

FIG. 22 shows an embodiment of a system 134 for cleaning a vehicle surface. The system 134 of FIG. 22 can be incorporated into the vehicle 122 of FIG. 21. The system 134 can include at least one fluid supply tank or reservoir 136 storing a supply of cleaning media 138, at least one telescoping nozzle device 1 applying the cleaning media 138 to the vehicle surface, and at least one conduit 140, hose, duct, and/or other tubing delivering the cleaning media 138 from the reservoir 136 to the telescoping nozzle device(s) 1. The system 134 can further include at least one pump 142 controlling the flow of cleaning media 138 from the reservoir 136 to the telescoping nozzle device(s) 1.

In the illustrated embodiment, telescoping nozzle devices 1 are provided for cleaning the front windshield 124, the rear windshield 126, the camera 128, the sensor 130, and the headlights or headlamps 132. Cleaning media 138 from the reservoir 136 is forced through the conduits 140 by the pump 142 and sprayed onto one or more of the vehicle surfaces 124-132 by the telescoping nozzle devices 1. Operation of the telescoping nozzle devices 1 is as described previously, with the nozzle rod 5 extending once the fluid pressure exceeds the predetermined extension pressure. The supply of cleaning fluid to one or more of the telescoping nozzle devices 1 can be automated, with cleaning fluid being supplied automatically predetermined intervals or on an as-needed basis, or can be manual, such as by providing a switch (not shown) in the vehicle cabin that is manually-actuatable by a driver of the vehicle.

The cleaning system 134 can further be provided with one or more fluid control valves (not shown) to control the flow of cleaning media to the telescoping nozzle devices 1, such as for individual operation of each telescoping nozzle device 10, a heating element (not shown) heating the cleaning media before it is applied to the vehicle surface, and additional conduits, ducts, tubing, hoses, fluid connectors, and/or manifolds (not shown) fluidly coupling components of the system 134 together and providing a fluid flow path from the reservoir 136 to each telescoping device 10. Additionally, the system, 134 can comprise more than one reservoir and/or more than one pump.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A telescopic nozzle device for cleaning a surface of a vehicle, the nozzle device having:
   a housing, the housing having:
      a fluid inlet channel suitable for introducing a washing fluid into the housing; and
      a rod opening that opens towards the inside of the housing at one end of the rod opening and opens towards the outside of the housing at a second end of the rod opening,
   a hollow nozzle rod having:
      a rod channel,
      an inlet opening for introducing washing fluid from outside the nozzle rod into the rod channel, and
      a nozzle for ejecting washing fluid from inside the rod channel to the outside of the nozzle rod,
   the nozzle rod having a retracted position and an extended position and being moveable between the retracted position and the extended position, the nozzle rod extending through the rod opening in the extended position, and
   a guiding system that guides the nozzle rod as it moves from the retracted position to the extended position,
   wherein the guiding systems comprises:
      a housing guide that is arranged inside the housing, the housing guide having a housing guide surface; and
      a rod guide that forms part of the nozzle rod and has a rod guide surface that is in contact or can come into contact with the housing guide surface to guide the nozzle rod as it moves from the retracted position to the extended position,
   wherein the housing guide has a lug that protrudes from an inward surface of a housing wall into the inside of the housing, whereby the housing guide surface is provided by a surface of the lug.

2. The telescopic nozzle device according to claim 1, wherein the rod opening is arranged in the housing wall from which housing wall the lug protrudes.

3. The telescopic nozzle device according to claim 2, wherein the rod opening is delimited by a rod opening wall and in that the lug has a surface that is flush with a part of the rod opening wall.

4. The telescopic nozzle device according to claim 1, wherein the housing guide has several lugs that protrude from the inward surface of the housing wall into the inside of the housing, whereby each lug provides a housing guide surface and whereby at least one of the several lugs protrudes further into the inside of the housing than at least one other of the several lugs.

5. The telescopic nozzle device according to claim 1, wherein the rod guide has a block arranged at an outer circumferential surface of the nozzle rod.

6. The telescopic nozzle device according to claim 5, wherein the rod guide has several blocks arranged at an outer circumferential surface of the nozzle rod, whereby each block provides a rod guide surface and whereby at least one of the several blocks is longer than at least one other of the several blocks.

7. The telescopic nozzle device according to claim 1, wherein in the extended position of the nozzle rod a part of the rod guide is arranged inside the rod opening.

8. The telescopic nozzle device according to claim 1, wherein in the extended position of the nozzle rod a part of the rod guide rests against an inward surface of a housing wall blocking further movement of nozzle rod out of the housing.

9. The telescopic nozzle device according to claim 1, wherein the hollow nozzle rod has an O-Ring as a check valve feature.

10. A vehicle comprising a vehicle surface and the telescopic nozzle device according to claim 1.

11. A system for cleaning a vehicle surface, comprising:
a fluid reservoir;
a pump in fluid communication with the fluid reservoir; and
the telescopic nozzle device according to claim 1, whereby the fluid inlet channel is in fluid communication with the pump.

* * * * *